US012659885B2

(12) United States Patent
Guo et al.

(10) Patent No.: US 12,659,885 B2
(45) Date of Patent: Jun. 16, 2026

(54) POWER ASSISTED RF EMF AVERAGE POWER CONTROL

(71) Applicant: Telefonaktiebolaget LM Ericsson (publ), Stockholm (SE)

(72) Inventors: Shiguang Guo, Kanata (CA); Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 373 days.

(21) Appl. No.: 18/571,221

(22) PCT Filed: Jun. 17, 2021

(86) PCT No.: PCT/IB2021/055379

§ 371 (c)(1),
(2) Date: Dec. 16, 2023

(87) PCT Pub. No.: WO2022/263896

PCT Pub. Date: Dec. 22, 2022

(65) Prior Publication Data

US 2024/0357516 A1    Oct. 24, 2024

(51) Int. Cl.
*H04W 52/36*    (2009.01)

(52) U.S. Cl.
CPC ................................ *H04W 52/367* (2013.01)

(58) Field of Classification Search
CPC ............. H04W 52/367; H04W 52/267; H04W 52/143; H04W 72/231; H04W 72/232;
(Continued)

(56) References Cited

U.S. PATENT DOCUMENTS

| 8,447,344 B2 * | 5/2013 | Ratasuk | .............. H04W 52/367 |
| | | | 455/515 |
| 11,516,743 B2 * | 11/2022 | Rahman | ................ H04W 52/16 |

(Continued)

FOREIGN PATENT DOCUMENTS

| WO | 2014198037 A1 | 12/2014 |
| WO | 2020111987 A1 | 6/2020 |

OTHER PUBLICATIONS

International Search Report and Written Opinion of the International Searching Authority, PCT/IB2021/055285, mailed Dec. 22, 2022, 10 pages.

(Continued)

*Primary Examiner* — Andrew Wendell
(74) *Attorney, Agent, or Firm* — Sage Patent Group

(57) ABSTRACT

Systems and methods are disclosed for power assisted Radio Frequency (RF) Electric and Magnetic Field (EMF) average power control for a Radio Access Network (RAN) node of a cellular communications system. In one embodiment, a method of operation of a controller for a RAN node comprises computing an average total transmit power over a control period and computing an initial Physical Resource Block (PRB) limit for transmission of a Physical Downlink Shared Channel (PDSCH) for the cell based on a comparison of the computed average and a reference. The method further comprises determining whether power scaling is to be used, adjusting the initial PRB limit and providing the adjusted PRB limit and a power scaling indication to a scheduler associated to the cell if power scaling is to be used, and otherwise providing the initial PRB limit and an indication of no power scaling to the scheduler.

20 Claims, 20 Drawing Sheets

(58) Field of Classification Search
CPC ..... H04W 52/04; H04W 52/06; H04W 52/18;
H04W 52/36; H04B 7/0623; H04B
7/18543
See application file for complete search history.

(56) References Cited

U.S. PATENT DOCUMENTS

| | | | | |
|---|---|---|---|---|
| 2009/0154403 | A1* | 6/2009 | Niwano | H04W 52/282 |
| | | | | 370/329 |
| 2013/0272257 | A1* | 10/2013 | Takaoka | H04W 52/42 |
| | | | | 370/329 |
| 2014/0126380 | A1* | 5/2014 | Kazmi | H04W 72/04 |
| | | | | 370/241 |
| 2016/0262129 | A1* | 9/2016 | Better | H04W 52/38 |
| 2016/0286496 | A1* | 9/2016 | Boloorian | H04W 52/146 |
| 2019/0200363 | A1* | 6/2019 | Rajendran | H04W 52/325 |
| 2021/0409151 | A1* | 12/2021 | Xu | H04L 1/0003 |
| 2022/0360472 | A1* | 11/2022 | Wang | H04W 52/367 |
| 2023/0403717 | A1* | 12/2023 | Rastegardoost | H04W 72/232 |
| 2024/0292344 | A1* | 8/2024 | Guo | H04W 52/367 |

OTHER PUBLICATIONS

Tornevik, Christer et al.; "Time Averaged Power Control of a 4G or a 5G Radio Base Station for RF EMF Compliance"; IEEE Access, IEEE; USA; vol. 8; Nov. 19, 2020; XP011825042; 14 pages.
3GPP TS 36.213 V13.6.0 (Jun. 2017); 3GPP; Technical Specification Group Radio Access Network; Evolved Universal Terrestrial Radio Access (E-UTRA); Physical layer procedures (Release 13); 390 pages.
3GPP TS 38.214 V15.0.0 (Dec. 2017); 3GPP; Technical Specification Group Radio Access Network; NR; Physical layer procedures for data (Release 15); 71 pages.

* cited by examiner

FIRST POLARIZATION

— · — · · — SECOND POLARIZATION

800

1516

POWER ASSISTED RF EMF AVERAGE POWER CONTROL

CROSS-REFERENCE TO RELATED APPLICATIONS

This application is a 35 U.S.C § 371 national stage application for International Application No. PCT/IB2021/055379, entitled "POWER ASSISTED RF EMF AVERAGE POWER CONTROL", filed on Jun. 17, 2021, assigned to the assignee hereof, and expressly incorporated herein by reference.

TECHNICAL FIELD

The present disclosure relates to Radio Frequency (RF) Electric and Magnetic Field (EMF) average power control for a Radio Access Network (RAN) node of a cellular communication system.

BACKGROUND

An Active Antenna System (AAS) is one of key technologies adopted by Fourth Generation (4G) Long Term Evolution (LTE) and Fifth Generation (5G) New Radio (NR) to enhance the wireless network performance and capacity by using Full Dimension Multiple Input Multiple Output (FD-MIMO) or massive Multiple Input Multiple Output (MIMO). A typical AAS system consists of a two-dimensional antenna element array with M rows, N columns, and K polarizations (K=2 in case of cross-polarization), as shown in FIG. 1.

Codebook-based precoding in an AAS is based on a set of pre-defined precoding matrices. The Precoding Matrix Indication (PMI) may be selected by the User Equipment (UE) based on measurements performed on a downlink (DL) Channel State Information Reference Signal (CSI-RS) (see, e.g., PCT International Publication No. WO2014/198037 A1, Third Generation Partnership Project (3GPP) Technical Specification (TS) 36.213 V13.6.0, and 3GPP TS 38.214 V15.0.0) or may be selected by the evolved Node B (eNB)/next generation Node B (gNB) based on measurements performed on uplink (UL) reference signals. The precoding matrix, denoted as W, may be further described as for example a two-stage precoding structure as follows:

$$W = W_1 W_2.$$

The first stage of the precoding structure, i.e., $W_1$, may be described as a codebook, and consists essentially a group of two-dimension (2D) Grid-of-Beams (GoB), which may be characterized as:

$$W_1 = \begin{bmatrix} w_h \otimes w_v & 0 \\ 0 & w_h \otimes w_v \end{bmatrix},$$

where $w_h$ and $w_v$ are precoding vectors selected from over-sampled Discrete Fourier Transform (DFT) for horizontal direction and vertical direction, respectively, and may be expressed by $$w_v = \frac{1}{\sqrt{M}} \left[ 1, e^{\frac{j2\pi v}{MO_1}}, \dots, e^{\frac{j2\pi mv}{MO_1}}, \dots, e^{\frac{j2\pi(M-1)v}{MO_1}} \right]^T$$

-continued $$w_h = \frac{1}{\sqrt{N}} \left[ 1, e^{\frac{j2\pi h}{NO_2}}, \dots, e^{\frac{j2\pi nv}{NO_2}}, \dots, e^{\frac{j2\pi(N-1)h}{NO_2}} \right]^T$$

where $O_1$ and $O_2$ are the over-sampling rate in vertical and horizontal directions, respectively. The second stage of the precoding matrix, i.e. $W_2$, is used for beam selection within the group of 2D GoB as well as the associated co-phasing between two polarizations.

In NR, $W_1$ is determined according to UE PMI report of i1 which reflects wideband and long-term channel properties, and $W_2$ is determined according to UE PMI report of i2 which reflects frequency-selective (subband) and short-term channel properties. The UE will feed back PMI to the gNB, and the gNB will apply the corresponding precoder for the transmission after receiving the UE feedback.

When any radio equipment is to be deployed, one must account for Radio Frequency (RF) exposure regulations. These exposure limitations are typically based on the guidelines from the International Commission on Non-Ionizing Radiation Protection (ICNIRP) but may take different forms in some countries and regions. The aim of the RF exposure regulations is to ensure that the human exposure to RF energy is kept within safe limits, which have been set with wide safety margins.

The RF exposure limitations become more important when new 4G/5G base stations and radios are equipped with AASs. These AASs increase the capacity and/or coverage by addition of an antenna array that increases the beamforming gain significantly. The consequence is a concentration of the radiated power into beams. As a further consequence, the traditionally used methods for calculation of exclusion zones based on the maximum Equivalent Isotropically Radiated Power (EIRP) of the node tend to generate significantly increased safety distances and exclusion zones. This increases deployment challenges, which has led mobile network operators to request functionality for reduction of exclusion zones, while strictly maintaining compliance with RF exposure regulations.

More specifically, the ICNIRP and other RF exposure limitations are expressed as the average power density over a specified time interval T. This power averaging opens a possibility for the requested reductions. Given a distance, the power density limit can be transformed to a corresponding average power threshold for the average total transmitted power. Thus, the momentary transmitted power can be significantly higher than the threshold during shorter times than T; however, the average total transmitted power must then be guaranteed to be below the threshold, typically obtained from the calculation of the exclusion zone. Thus, to be allowed to use a safety distance that is shorter than what is obtained using the maximum EIRP of the AAS equipped node, control functionality is needed that guarantees that the average total transmitted power is below the threshold 100% of the time.

In other words, a consequence of the introduction of AAS is that the size of the RF Electric and Magnetic Field (EMF) exclusion zone increases when the beamforming gain increases, and no time-averaging is taken into account. Such increased exclusion zones could make deployment challenging in, e.g., dense urban environments. Operators are requesting a functionality that can reduce the time-averaged power (or EIRP) levels to a pre-determined level needed to obtain a certain exclusion zone, with a minimum impact on the capacity and coverage of the served cell.

SUMMARY

Systems and methods are disclosed herein for power assisted Radio Frequency (RF) Electric and Magnetic Field (EMF) average power control for a Radio Access Network (RAN) node of a cellular communications system. In one embodiment, a method of operation of a controller for a RAN node for a cellular communications system comprises computing an average total transmit power for transmission for a cell over a control period that comprises a plurality of transmission time intervals (TTIs) and computing an initial Physical Resource Block (PRB) limit for transmission of a Physical Downlink Shared Channel (PDSCH) for the cell based on a comparison of the average total transmit power and a reference average total transmit power. The method further comprises determining whether power scaling is to be used. The method further comprises, if power scaling is to be used, adjusting the initial PRB limit to provide an adjusted PRB limit and providing the adjusted PRB limit and a power scaling indication to a scheduler associated to the cell. The method further comprises, if power scaling is not to be used, providing the initial PRB limit and an indication of no power scaling to the scheduler associated to the cell. In this manner, the time-averaged transmit power of the RAN node can be reduced to a predetermined level (e.g., a level needed to obtain a certain RF EMF exclusion zone), with a minimum impact on the capacity and coverage of the respective cell.

In one embodiment, power scaling is to be used if the initial PRB limit is less than or equal to a predefined or preconfigured minimum, non-zero PRB threshold.

In one embodiment, power scaling is to be used if either: (a) the initial PRB limit is less than or equal to a predefined or preconfigured minimum, non-zero PRB threshold or (b) the initial PRB limit is greater than the predefined or preconfigured minimum, non-zero PRB threshold but a prior initial PRB limit for a prior control period was less than or equal to the predefined or preconfigured minimum, non-zero PRB threshold and a predefined or preconfigured amount of time has not elapsed between a first time instances associated to the prior control period and a second time instance associated to the control period.

In one embodiment, determining) whether power scaling is to be used comprises determining whether the controller is configured in a power scaling state. In one embodiment, the controller is configured in the power scaling state if the initial PRB limit is less than or equal to a predefined or preconfigured minimum, non-zero PRB threshold. In another embodiment, the controller is configured in the power scaling state if either: (a) the initial PRB limit is less than or equal to a predefined or preconfigured minimum, non-zero PRB threshold or (b) the initial PRB limit is greater than the predefined or preconfigured minimum, non-zero PRB threshold but a prior initial PRB limit for a prior control period was less than or equal to the predefined or preconfigured minimum, non-zero PRB threshold and a predefined or preconfigured amount of time has not elapsed between a first time instances associated to the prior control period and a second time instance associated to the control period.

In one embodiment, adjusting the initial PRB limit to provide the adjusted PRB limit comprise applying a scaling factor to the initial PRB limit, the scaling factor corresponding to a power scaling factor to be applied. In one embodiment, the power scaling indication indicates the power scaling factor.

In one embodiment, the adjusted PRB limit indicates a number of PRBs that is greater than a number of PRBs indicated by the initial PRB limit.

In one embodiment, the power scaling is power de-boosting such that power spectral density per resource element comprised in the physical downlink shared channel is reduced as compared to when power de-boosting is not used.

Corresponding embodiments of a RAN node are also disclosed. In one embodiment, a RAN node for a cellular communications system comprises an average power controller adapted to compute an average total transmit power for transmission for a cell over a control period that comprises a plurality of TTIs, compute an initial PRB limit for transmission of a physical downlink shared channel for the cell based on a comparison of the average total transmit power and a reference average total transmit power, and determine whether power scaling is to be used. The average power controller is further adapted to, if power scaling is to be used, adjust the initial PRB limit to provide an adjusted PRB limit and provide the adjusted PRB limit and a power scaling indication to a scheduler associated to the cell. The average power controller is further adapted to, if power scaling is not to be used, provide the initial PRB limit and an indication of no power scaling to the scheduler associated to the cell.

In another embodiment, a RAN node for a cellular communications system comprises processing circuitry configured to cause the network node to implement an average power controller configured to compute an average total transmit power for transmission for a cell over a control period that comprises a plurality of TTIs, compute an initial PRB limit for transmission of a physical downlink shared channel for the cell based on a comparison of the average total transmit power and a reference average total transmit power, and determine whether power scaling is to be used. The processing circuitry is further configured to cause the network node to implement the average power controller such that the average power controller is further configured to, if power scaling is to be used, adjust the initial PRB limit to provide an adjusted PRB limit and provide the adjusted PRB limit and a power scaling indication to a scheduler associated to the cell. The processing circuitry is further configured to cause the network node to implement the average power controller such that the average power controller is further configured to, if power scaling is not to be used, provide the initial PRB limit and an indication of no power scaling to the scheduler associated to the cell.

In another embodiment, a method performed by a scheduler for a RAN node for a cellular communications system comprises obtaining a recommended PRB limit for PDSCH transmission for an associated cell and a power scaling indication that indicates whether power scaling is needed for PDSCH transmission for the associated cell, the recommended PRB limit and the power scaling indication being for a control period comprising a plurality of TTIs. The method further comprises determining whether the power scaling indication indicates that power scaling is needed, determining whether the associated cell is cell-edge centric where the associated cell is cell-edge centric if the associated cell predominantly serves cell-edge wireless communication devices, and performing one or more actions based on whether the power scaling indication indicates that power scaling is needed and whether the associated cell is cell-edge centric.

In one embodiment, performing the one or more actions comprises either applying the recommended PRB limit or adjusting the PRB limit based on whether the power scaling indication indicates that power scaling is needed or not needed and whether the associated cell is cell-edge centric or not.

In one embodiment, performing the one or more actions comprises either applying power scaling or not based on whether the power scaling indication indicates that power scaling is needed or not needed and whether the associated cell is cell-edge centric or not.

In one embodiment, determining whether the power scaling indication indicates that power scaling is needed comprises determining that the power scaling indication indicates that power scaling is needed, determining whether the associated cell is cell-edge centric comprises determining that the associated cell is not cell-edge centric, and performing the one or more actions comprises applying the recommended PRB limit and power scaling responsive to determining that the power scaling indication indicates that power scaling is needed and determining that the associated cell is not cell-edge centric. In one embodiment, performing the one or more actions further comprises adjusting one or more parameters associated to link adaptation in a manner that that makes the link adaptation more conservative relative to the link adaptation prior adjusting the one or more parameters, responsive to applying the power scaling.

In one embodiment, determining whether the power scaling indication indicates that power scaling is needed comprises determining that the power scaling indication indicates that power scaling is needed and determining whether the associated cell is cell-edge centric comprises determining that the associated cell is cell-edge centric. Further, performing the one or more actions comprises, responsive to determining that the power scaling indication indicates that power scaling is needed and determining that the associated cell is cell-edge centric, modifying the recommended PRB limit to provide a modified PRB limit, applying the modified PRB limit, and refraining from applying power scaling. In one embodiment, modifying the recommended PRB limit comprises modifying the recommended PRB limit such that the recommended PRB limit is reduced in proportion to a scaling factor associated to the power scaling indication in order to provide the modified PRB limit.

In one embodiment, determining whether the power scaling indication indicates that power scaling is needed comprises determining that the power scaling indication indicates that power scaling is not needed and determining whether the associated cell is cell-edge centric comprises determining that the associated cell is not cell-edge centric. Further, performing the one or more actions comprises, responsive to determining that the power scaling indication indicates that power scaling is not needed and determining that the associated cell is not cell-edge centric, modifying the recommended PRB limit to provide a modified PRB limit, applying the modified PRB limit, and applying power scaling. In one embodiment, modifying the recommended PRB limit comprises applying a scaling factor to the recommended PRB limit that increases the recommended PRB limit in proportion of an applied power scaling factor to provide the modified PRB limit. In one embodiment, performing the one or more actions further comprises adjusting one or more parameters associated to link adaptation in a manner that that makes the link adaptation more conservative relative to the link adaptation prior adjusting the one or more parameters, responsive to applying the power scaling.

In one embodiment, determining whether the power scaling indication indicates that power scaling is needed comprises determining that the power scaling indication indicates that power scaling is not needed, determining whether the associated cell is cell-edge centric comprises determining that the associated cell is cell-edge centric, and performing the one or more actions comprises applying the recommended PRB limit responsive to determining that the power scaling indication indicates that power scaling is not needed and determining that the associated cell is cell-edge centric.

In one embodiment, determining whether the associated cell is cell-edge centric comprises determining that the associated cell is cell-edge centric if an average cell edge rate for the associated cell over an associated period of time is greater than a predefined or preconfigured cell edge rate threshold and otherwise determining that the associated cell is not cell-edge centric. The average cell edge rate for the associated cell over the associated period of time is a ratio between a total number of cell edge wireless communication devices in the associated cell during the associated period of time and a total number of wireless communication devices in the cell during the associated period of time. A cell edge wireless communication device is a wireless communication device for which a minimum Signal to Interference plus Noise Ratio (SINR) throughout an associated wireless communication device session during the associated period of time is less than a predefined or preconfigured SINR threshold.

Corresponding embodiments of a RAN node are also disclosed. In one embodiment, a RAN node for a cellular communications system comprises a scheduler adapted to obtain a recommended PRB limit for PDSCH transmission for an associated cell and a power scaling indication that indicates whether power scaling is needed for PDSCH transmission for the associated cell, the recommended PRB limit and the power scaling indication being for a control period comprising a plurality of TTIs. The scheduler is further adapted to determine whether the power scaling indication indicates that power scaling is needed, determine whether the associated cell is cell-edge centric, the associated cell being cell-edge centric if the associated cell predominantly serves cell-edge wireless communication devices, and perform one or more actions based on whether the power scaling indication indicates that power scaling is needed and whether the associated cell is cell-edge centric.

In another embodiment, a RAN node for a cellular communications system comprises processing circuitry that causes the RAN node to implement a scheduler configured to obtain a recommended PRB limit for PDSCH transmission for an associated cell and a power scaling indication that indicates whether power scaling is needed for PDSCH transmission for the associated cell, the recommended PRB limit and the power scaling indication being for a control period comprising a plurality of TTIs. The processing circuitry further causes the RAN node to implement the scheduler such that the scheduler is further configured to determine whether the power scaling indication indicates that power scaling is needed, determine whether the associated cell is cell-edge centric, the associated cell being cell-edge centric if the associated cell predominantly serves cell-edge wireless communication devices, and perform one or more actions based on whether the power scaling indication indicates that power scaling is needed and whether the associated cell is cell-edge centric.

In another embodiment, a method performed by a scheduler for a RAN node for a cellular communications system comprises obtaining a recommended PRB limit for PDSCH transmission for an associated cell, the recommended PRB limit being for a control period comprising a plurality of TTIs. The method further comprises determining that the scheduler is to enter a power scaling state based on the recommended PRB limit. The method further comprises, responsive to determining that the scheduler is to enter the power scaling state, for each TTI of the plurality of TTIS for the control period: determining whether to apply the recommended PRB limit and whether to apply power scaling for the TTI and operating in accordance with a result of the determining whether to apply the recommended PRB limit and whether to apply power scaling for the TTI.

In one embodiment, determining whether to apply the recommended PRB limit and whether to apply power scaling for the TTI comprises determining that at least one cell-edge wireless communication device is scheduled for the TTI, responsive thereto, applying the recommended PRB limit for the TTI and refraining from applying power scaling for the TTI.

In one embodiment, determining whether to apply the recommended PRB limit and whether to apply power scaling for the TTI comprises determining that no cell-edge wireless communication devices are scheduled for the TTI and, responsive thereto, applying power scaling for the TTI, adjusting the recommended PRB limit for the TTI in proportion to the power scaling to provide a modified PRB limit for the TTI, and applying the modified PRB limit for the TTI. In one embodiment, determining whether to apply the recommended PRB limit and whether to apply power scaling for the TTI comprises, responsive to determining that no cell-edge wireless communication devices are scheduled for the TTI, adjusting link adaptation based on the power scaling for the TTI. In one embodiment, obtaining the recommended PRB limit comprises obtaining the recommended PRB limit from an associated average power controller and determining whether to apply the recommended PRB limit and whether to apply power scaling for the TTI comprises, responsive to determining that no cell-edge wireless communication devices are scheduled for the TTI, reporting a scaled number of resources used in the TTI to the associated average power controller, the scaled number of resources being an actual number of resources used in the TTI that is scaled in proportion to a power scaling factor utilized when applying power scaling for the TTI.

Corresponding embodiments of a RAN node are also disclosed. In one embodiment, a RAN node for a cellular communications system comprises a scheduler adapted to obtain a recommended PRB limit for PDSCH transmission for an associated cell, the recommended PRB limit being for a control period comprising a plurality of TTIs. The scheduler is further adapted to determine that the scheduler is to enter a power scaling state based on the recommended PRB limit. The scheduler is further adapted to, responsive to determining that the scheduler is to enter the power scaling state, for each TTI of the plurality of TTIs for the control period, determine whether to apply the recommended PRB limit and whether to apply power scaling for the TTI and operate in accordance with a result of the determining whether to apply the recommended PRB limit and whether to apply power scaling for the TTI.

In one embodiment, a RAN node for a cellular communications system comprises processing circuitry that cause the RAN node to implement a scheduler configured to obtain a recommended PRB limit for PDSCH transmission for an associated cell, the recommended PRB limit being for a control period comprising a plurality of TTIs. The processing circuitry further causes the RAN node to implement the scheduler such that the scheduler is further configured to determine that the scheduler is to enter a power scaling state based on the recommended PRB limit. The processing circuitry further causes the RAN node to implement the scheduler such that the scheduler is further configured to, responsive to determining that the scheduler is to enter the power scaling state, for each TTI of the plurality of TTIs for the control period, determine whether to apply the recommended PRB limit and whether to apply power scaling for the TTI and operate in accordance with a result of the determining whether to apply the recommended PRB limit and whether to apply power scaling for the TTI.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
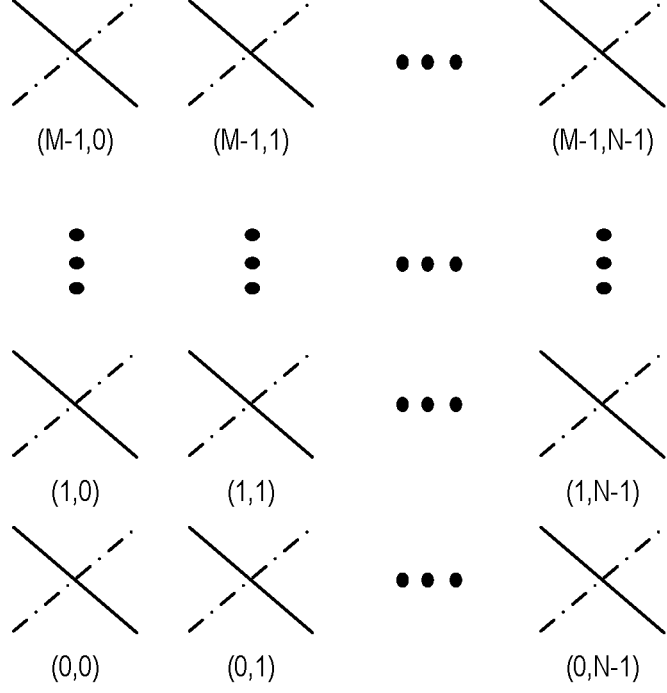
FIG. 1 illustrates a typical Active Antenna System (AAS)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. There are two different operation modes for multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

In some embodiments, a set Transmission Points (TPs) is a set of geographically co-located transmit antennas (e.g., an antenna array (with one or more antenna elements)) for one cell, part of one cell or one Positioning Reference Signal (PRS)-only TP. TPs can include base station (eNB) antennas, Remote Radio Heads (RRHs), a remote antenna of a base station, an antenna of a PRS-only TP, etc. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

As described above, there is a need for systems and methods that provide functionality that can reduce the time-averaged power (or Equivalent Isotropically Radiated Power (EIRP)) levels of a base station (e.g., an eNB or gNB) or other RAN node (e.g., gNB-DU) to a predetermined threshold level needed to obtain a certain Radio Frequency (RF) Electric and Magnetic Field (EMF) exclusion zone, with a minimum impact on the capacity and coverage of the served cell.

Figure 2:
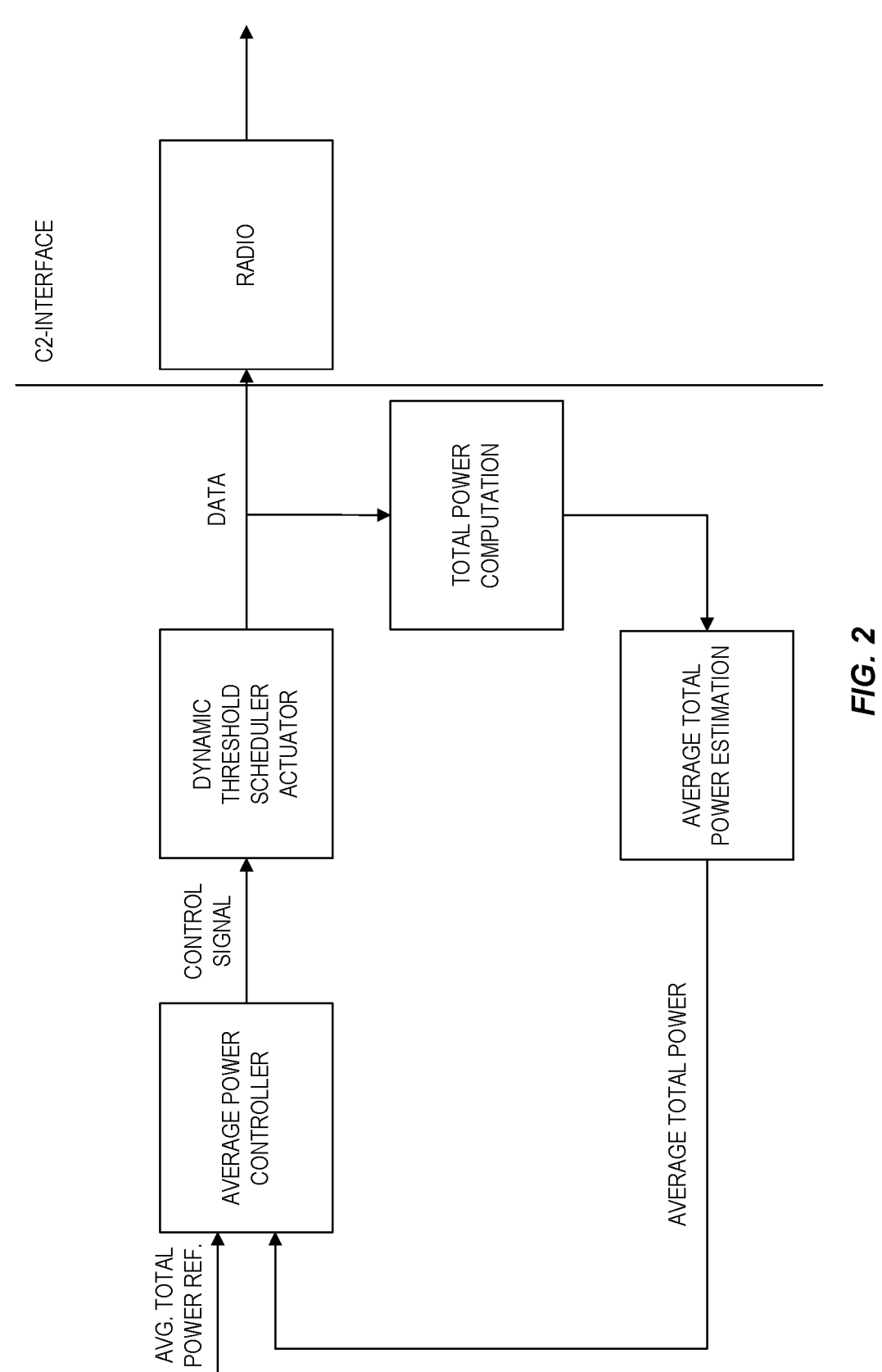
FIG. 2 illustrates an example of an average power control solution that addresses the need for providing functionality that can reduce time-averaged power levels of a base station or other Radio Access Network (RAN) node to a predetermined threshold level needed to obtain a certain Radio Frequency (RF) Electric and Magnetic Field (EMF) exclusion zone.

One example average power control solution that addresses the problem noted above is as follows. In a live network, traffic could be varying over time. So, the time-averaged total transmit power resulting from traffic could also be varying over time, and much lower than the peak transmit power. As shown in FIG. 2, for the example average power control solution, the time-averaged total transmit power is estimated at Distributed Unit (DU) or virtual DU (vDU) subsystem of a gNB. A Proportional-Derivative (PD) controller is employed to limit the Physical Resource Block (PRB) resources at the scheduler of the gNB so that the time averaged total transmit power is limited to stay below an average power threshold, associated with the exclusion zone. This will then decrease the exclusion zone distances as needed. As illustrated in FIG. 2, the PD controller includes parts of the scheduler (i.e., a dynamic threshold scheduler actuator), a total power computation function, a total average power estimation function, and an average power controller arranged as illustrated. In operation, the total power computation function computes the total transmit power per transmit time interval (TTI), and the total average power estimation function averages the total transmit power over a number of desired control periods, each control period consisting of several TTIs (e.g., 0.6 seconds). The average power controller compares the computed average total transmit power and a reference average total power to provide an appropriate control signal to the dynamic threshold scheduler actuator. In one example, the control signal may indicate a PRB limit (e.g., as a percentage of the total number of PRBs). This control signal is updated once per control period. Based on the control signal, the dynamic threshold scheduler actuator performs scheduling for each TTI in accordance with the PRB limit. Note that the PRB limit is only applied on traffic channels, such as Physical Downlink Shared Channel (PDSCH). The PRB limit is not applied to control channels, such as Physical Downlink Control Channel (PDCCH) and Synchronization Signal Block (SSB). This will avoid impacting coverage of the associated cell. While not needed to understand the embodiments of the present disclosure, the interested reader can find further details regarding an example average power control solution in Christer Törnevik, Torbjörn Wigren, Shiguang Guo, and Ken Huisman, "Time Averaged Power Control of a 4G or a 5B Radio Base Station for RF EMF Compliance," *IEEE Access*, vol. 8, pp. 211937-211950, 2020.

Figure 3:
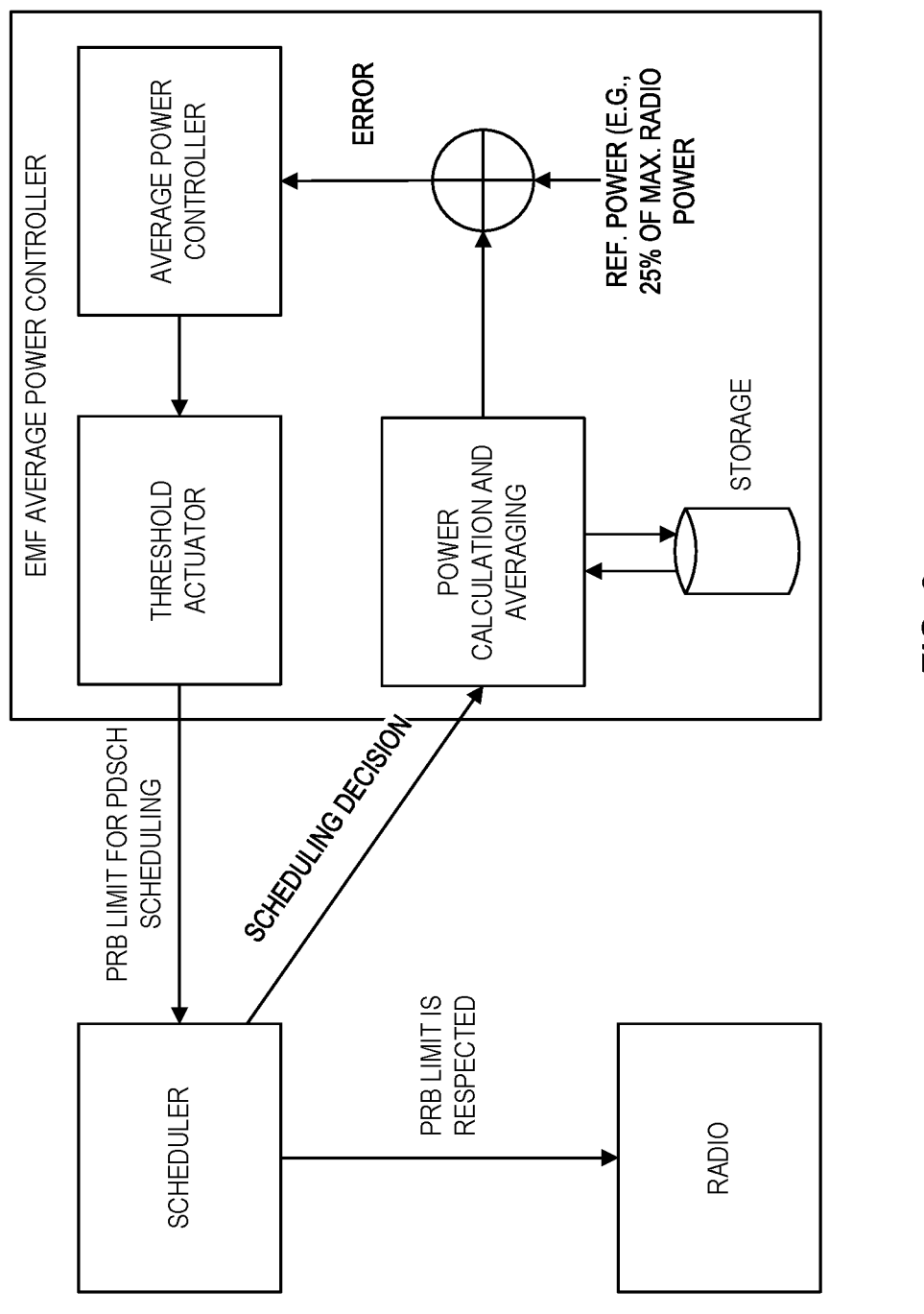
FIG. 3 illustrates an implementation of an average power control scheme inside a Distributed Unit (DU) of a next generation Node B (gNB) or virtualized DU (vDU)
Figure 4:
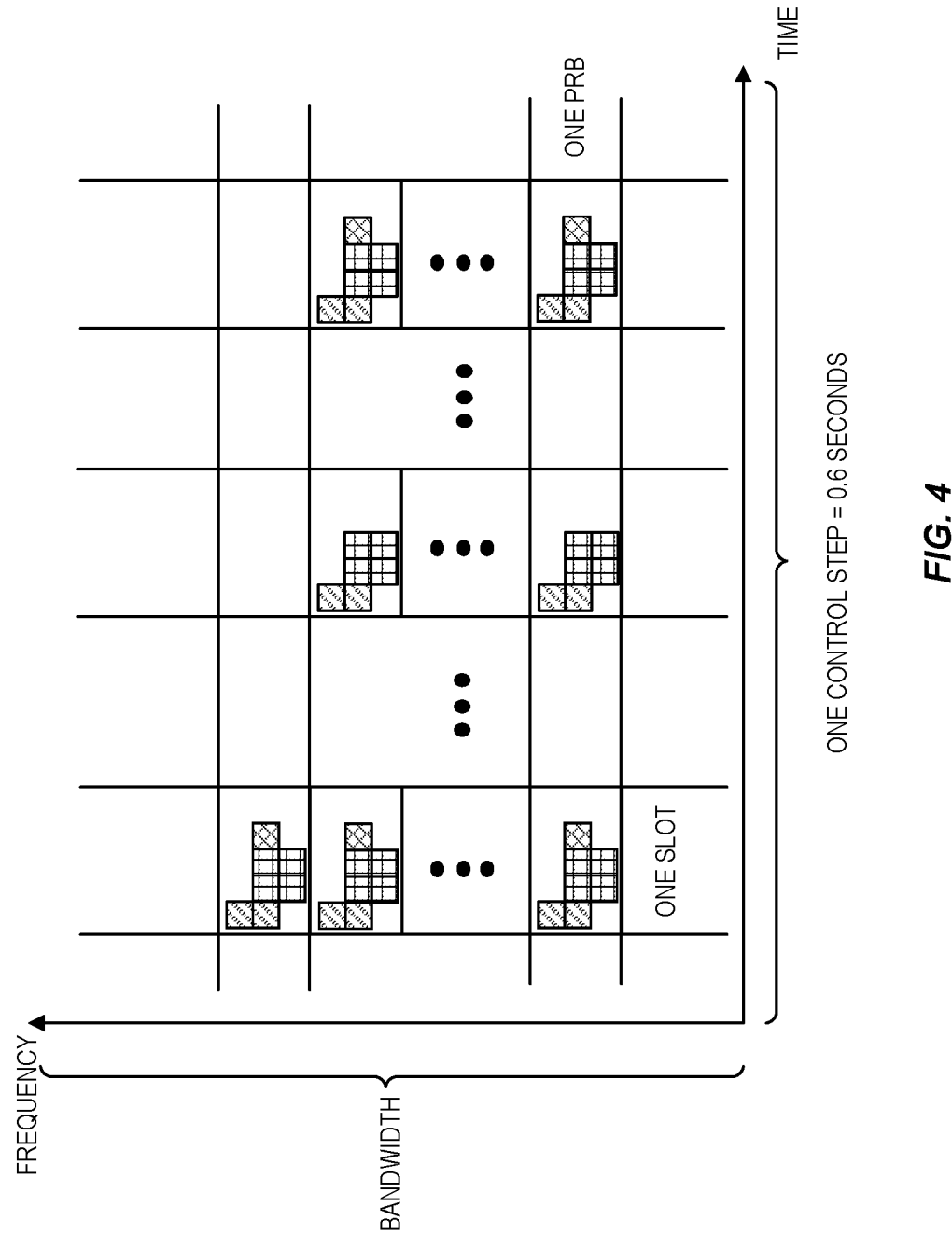
FIG. 4 illustrates an example of different Transmit Time Intervals (TTIs) and different types of radio resources scheduled in each TTI.

FIG. 3 illustrates an implementation of an average power control scheme inside a DU or virtualized DU (vDU). As illustrated, the scheduler provides scheduling details to the average power controller on a per TTI (or slot) basis. The scheduling details may include information such as, e.g., how many radio resources (e.g., how may Resource Elements (REs)) are scheduled or allocated in the TTI, which can be used to compute the total transmit power for the TTI. The average power controller then estimates the total transmit power for each TTI within a control period (e.g., 0.6 seconds) by considering all the radio resources being scheduled in each TTI, as seen in FIG. 4. The estimated total transmit power is averaged with the past samples (e.g., the estimated total transmit power values for all of the control periods are averaged) to get a time-averaged total transmit power. At each control step, the average power controller runs a PD controller to compute the required actuator value, such as the PRB limit required at the scheduler, so that the time-averaged total transmit power can be maintained below the set average power threshold. In this solution, the beamforming gain is assumed to be equal in all directions within the cell.

Figure 5:
FIG. 5 illustrates an example of how Model Predictive Control (MPC) can be employed in the average power control solution of FIGS. 2 and 3.
Figure 5:
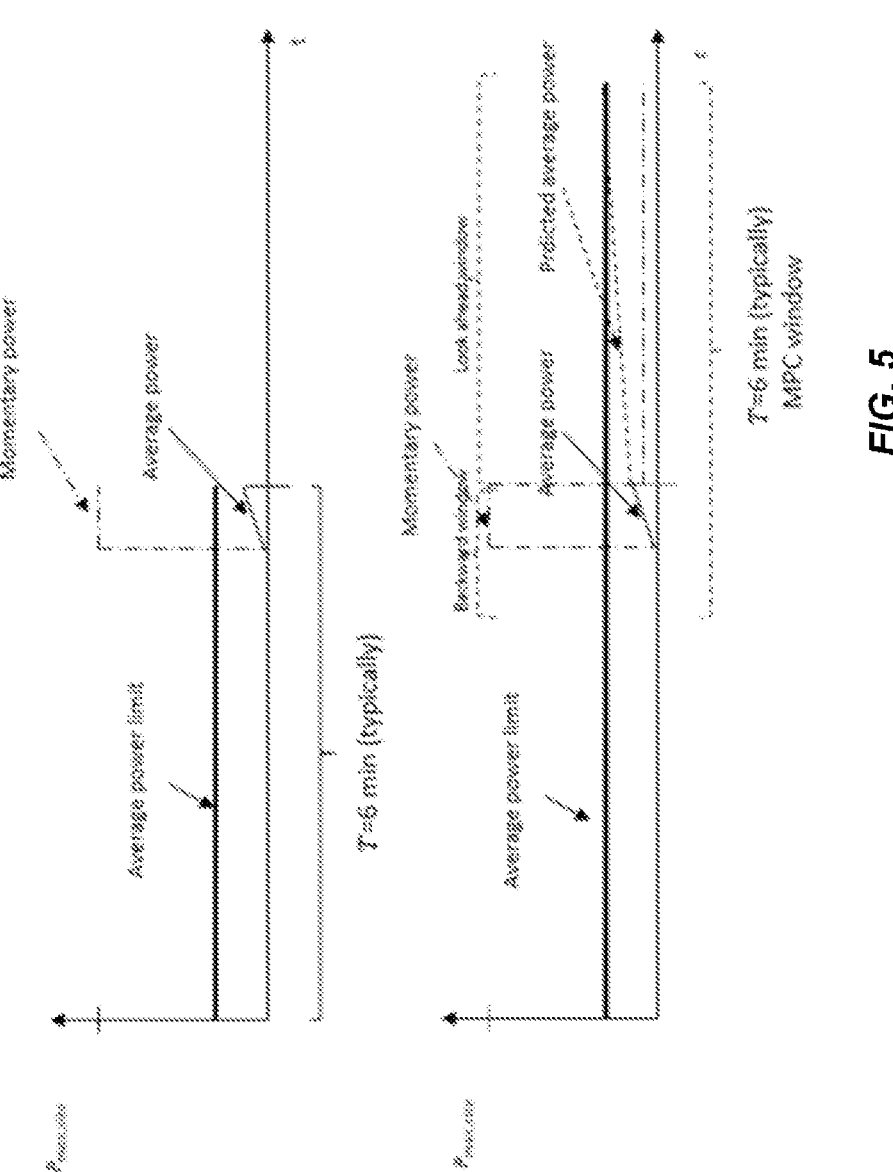

In case of very fast traffic increase, the average power controller needs to react very quickly to avoid an overshooting condition. As such, a hard limit loop is introduced. When the hard limit loop is triggered, a minimum actuator value (e.g., a minimum PRB limit) will be used to decrease the average power as quickly as possible. The minimum PRB limit may be a minimum, non-zero amount of PRBs needed for operation (e.g., 6 PRBs). In one implementation of the average power controller solution, Model Predictive Control (MPC) is employed as shown in FIG. 5. When using MPC, the future average transmit power is predicted so that the hard limit can be triggered early to avoid any overshooting in the future.

When using the existing average power controller solution described above with respect to FIGS. 2, 3, 4, and 5, the safety net denoted hard limit loop will dominate over the Proportional-Derivative (PD) controller when the average power threshold is very low such as, e.g., 9.6% of the peak radio power. This means that a minimum amount of Physical Resource Blocks (PRBs) is allowed for scheduling for extended periods. This will result in severe capacity performance degradation due to the lack of available PRB resources, especially in medium and heavy traffic conditions.

Systems and methods are disclosed herein that use power scaling in addition to PRB limitation to address the aforementioned and/or other problems. Using power scaling in addition to PRB limitation will help to improve throughput performance while still meeting the average power threshold set for the exclusion zone. Some aspects of the present disclosure are as follows:

In some embodiments, a power scaling state is added within the average power controller. In one embodiment, the initial state of the average power controller is non-power-scaling state. As used herein, "power scaling" refers to power de-boosting, i.e., reducing the power spectral density (PSD) of each Resource Element (RE) used for one or more data channels (e.g., Physical Downlink Shared Channel (PDSCH)). Note that power scaling is performed at baseband (i.e., in a digital way) by scaling of the amplitude of the digital signal.

In some embodiments, power scaling is applied when the hard limit condition is triggered. In one embodiment, power scaling is applied by setting the average power controller to the power scaling state. In this state, a higher number of PRBs is allowed for scheduling by applying power de-boosting to maintain the average total transmit power within the defined limit while increasing the number of PRBs available to the scheduler. Upon transitioning to the power scaling state, an optional timer is started to maintain this state for at least a few control steps (e.g., at least 2 control steps or at least 3 control steps), e.g., to avoid a ping-pong effect.

In some embodiments, an interface between the average power controller and the scheduler is defined to enable the average power controller to notify the scheduler about the power scaling (e.g., about a power scaling factor) in addition to the PRB limit.

In some embodiments, within the scheduler, the scheduler applies power scaling and link adaptation (LA) adjustment based on cell edge/center wireless communication device (WCD) statistics per control step or per TTI.

In embodiments, within the average power controller, the power scaling state exits when the value (non-scaled) PRB limit is larger than a threshold (e.g., minimum PRB limit*X, where X is a predefined or preconfigured, e.g., as a constant value) and a predefined or preconfigured amount of time as elapsed since transitioning to the power scaling state. Note that, in some embodiments, the PRB limit is defined as a percentage of PRBs in a bandwidth of the associated cell.

In some embodiments, scaling of either the reported amount of resources used by the scheduler per TTI or of the estimated total transmit power is performed to compensate for power scaling when estimating the total transmit power per TTI and thus the average total transmit power used by the average power controller to determined/update the PRB limit.

While not being limited to or by any particular advantage, embodiments of the present disclosure may provide one or more of the following advantages. Embodiments of the present disclosure use power scaling in addition to PRB limitation when the safety net hard limit is reached. By using power scaling in addition to PRB limitation, the PRB limit can be increased such that throughput performance can be improved while also maintaining total average power within the defined limit. In some embodiments, power de-boosting is prevented for cell edge WCDs since power de-boosting would negatively impact cell edge WCDs. In some embodiments, power de-boosting is applied even though the average power controller does not request power scaling, in case of no-cell edge WCDs. This allows more PRBs to be available for cell center WCDs. This improves the overall performance by balancing PRB reduction and power de-boosting for both cell edge and cell center WCDs.

Figure 6:
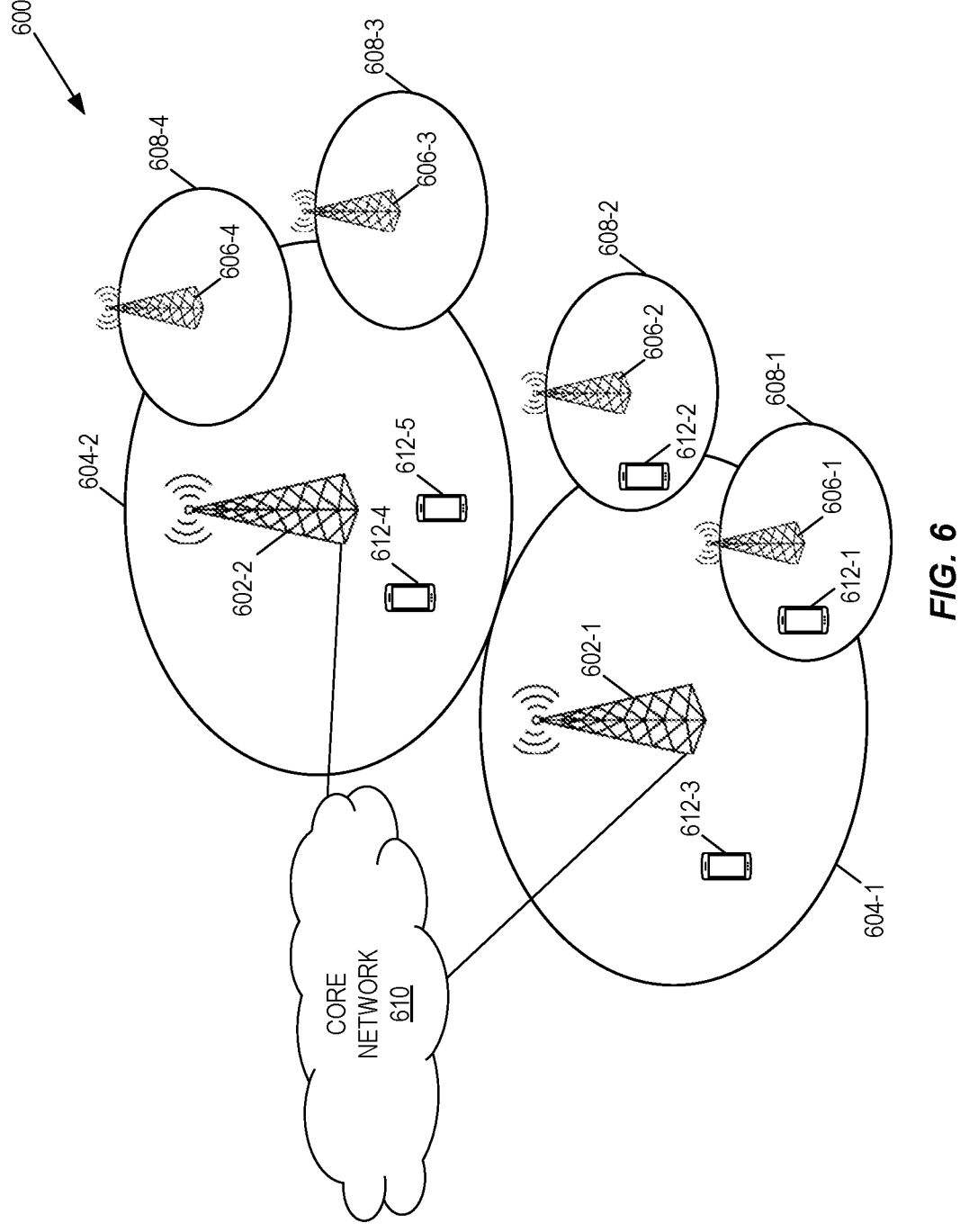
FIG. 6 illustrates one example of a cellular communications system according to some embodiments of the present disclosure.

In this regard, FIG. 6 illustrates one example of a cellular communications system 600 in which embodiments of the present disclosure may be implemented. In the embodiments described herein, the cellular communications system 600 is a 5G system (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC). In this example, the RAN includes base stations 602-1 and 602-2, which in the 5GS include gNBs and optionally next generation eNBs (ng-eNBs) (e.g., LTE RAN nodes connected to the 5GC) and in the EPS include eNBs, controlling corresponding (macro) cells 604-1 and 604-2. The base stations 602-1 and 602-2 are generally referred to herein collectively as base stations 602 and individually as base station 602. Likewise, the (macro) cells 604-1 and 604-2 are generally referred to herein collectively as (macro) cells 604 and individually as (macro) cell 604. The RAN may also include a number of low power nodes 606-1 through 606-4 controlling corresponding small cells 608-1 through 608-4. The low power nodes 606-1 through 606-4 can be small base stations (such as pico or femto base stations) or RRHs, or the like. Notably, while not illustrated, one or more of the small cells 608-1 through 608-4 may alternatively be provided by the base stations 602. The low power nodes 606-1 through 606-4 are generally referred to herein collectively as low power nodes 606 and individually as low power node 606. Likewise, the small cells 608-1 through 608-4 are generally referred to herein collectively as small cells 608 and individually as small cell 608. The cellular communications system 600 also includes a core network 610, which in the 5GS is the 5GC and in the EPS is the EPC. The base stations 602 (and optionally the low power nodes 606) are connected to the core network 610.

The base stations 602 and the low power nodes 606 provide service to wireless communication devices (WCDs) 612-1 through 612-5 in the corresponding cells 604 and 608. The WCDs 612-1 through 612-5 are generally referred to herein collectively as WCDs 612 and individually as WCD 612. In the following description, the WCDs 612 are oftentimes UEs, but the present disclosure is not limited thereto.

Figure 7:
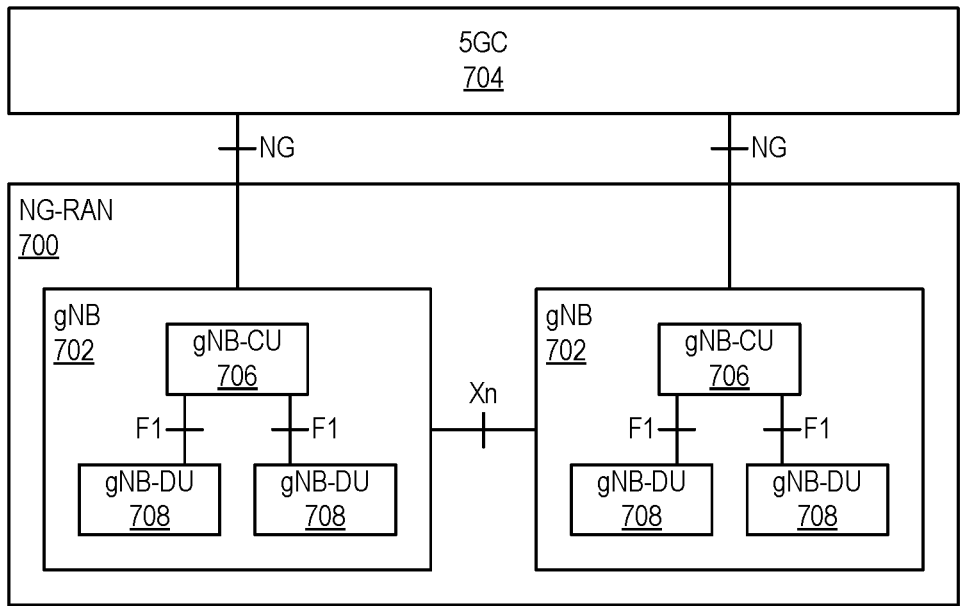
FIG. 7 illustrates the current architecture of a Next Generation RAN (NG-RAN) in which gNBs have a split Central Unit (CU)/DU architecture, as described in Third Generation Partnership Project (3GPP) Technical Specification (TS) 38.401.

In some example embodiments, the base stations 602 are gNBs. In this regard, FIG. 7 illustrates the current architecture of a NG-RAN 700 in which gNBs 702 have a split CU/DU architecture, as described in 3GPP Technical Specification (TS) 38.401. More specifically, the NG-RAN 700 includes a set of gNBs 702 connected to a 5GC 704 through the NG interface. A gNB 702 can support Frequency Domain Duplexing (FDD) mode, Time Division Duplexing (TDD) mode, or dual mode. The gNBs 702 can be interconnected through the Xn interface. Each gNB 702 may include a gNB-CU 706 and one or more gNB-DUs 708 connected via the F1 interface. One gNB-DU 708 is connected to only one gNB-CU 706.

NG, Xn, and F1 are logical interfaces. The NG-RAN 700 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1), the related TNL protocol and the functionality are specified.

A gNB 702 may also be connected to an LTE eNB via the X2 interface. Another architectural option is that where an LTE eNB connected to the EPC is connected over the X2 interface with a so called en-gNB. The latter is a gNB not connected directly to a core network and connected via X2 to an eNB for the sole purpose of performing dual connectivity.

Figure 12:
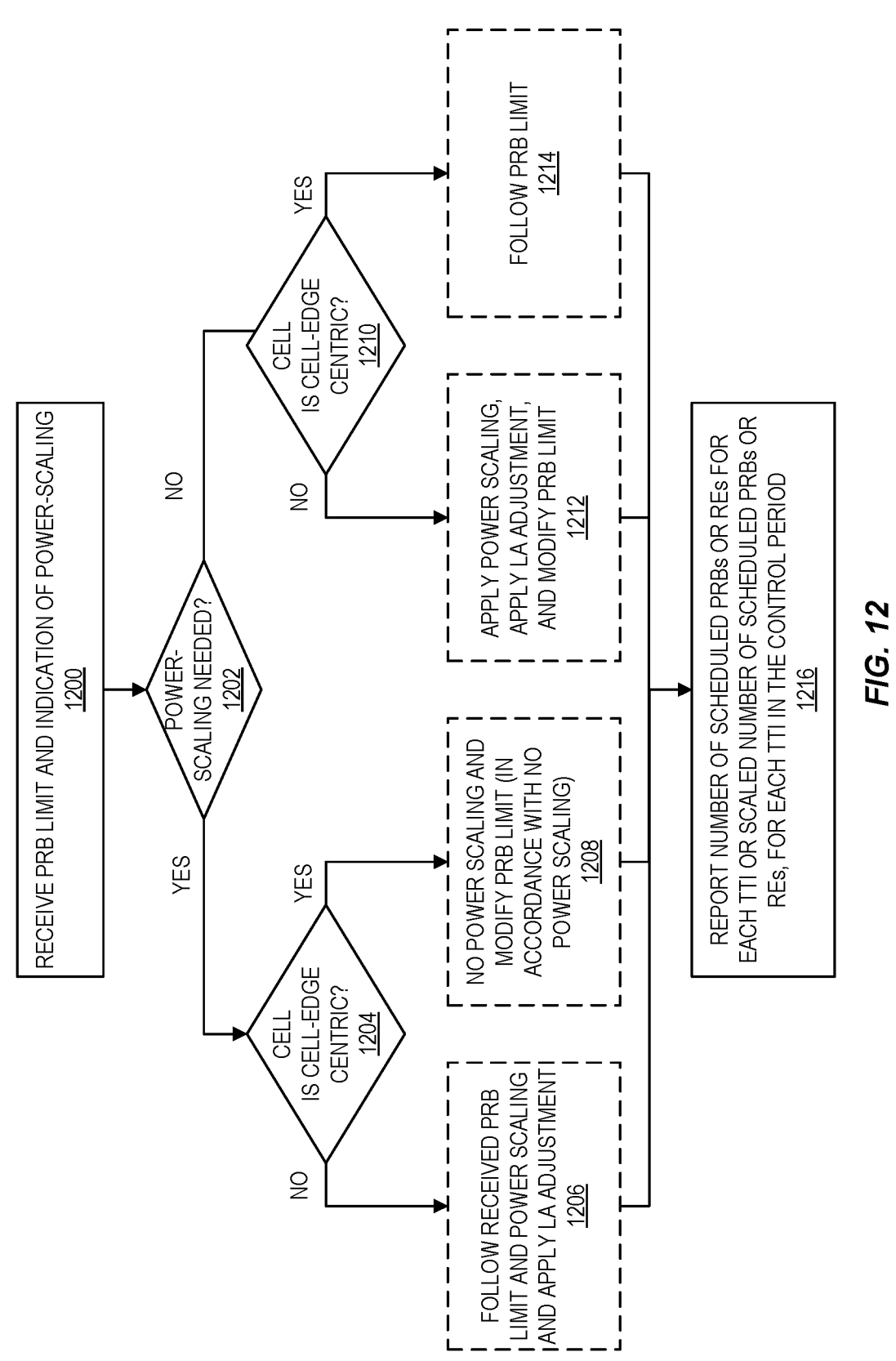
FIG. 12 is a flow chart that illustrates the operation of the scheduler of FIG. 8 in accordance with one embodiment of the present disclosure.

The architecture in FIG. 12 can be expanded by spitting the gNB-CU 706 into two entities, namely, a Control Plane (CP) entity (gNB-CU-CP or simply CU-CP) and a User Plane (UP) entity (gNB-CU-UP or simply CU-UP). So, in the CP-UP split architecture option, the RAN protocol stack functionality is separated in different parts. The CU-CP is expected to handle the Radio Resource Control (RRC) layer, the CU-UP will handle the Packet Data Convergence Protocol (PDCP) layer, and the gNB-DU 708 will handle the Radio Link Control (RLC) layer, the MAC layer, and the physical (PHY) layer of the protocol stack. In some further split the gNB-DU 708 can have a separate unit that handles the PHY parts separately compared to RLC and MAC layers that are handled in a DU.

As different units handle different protocol stack functionalities, there will be a need for inter-node communication between the gNB-DU 708, the gNB-CU-UP, and the gNB-CU-CP. This is achieved via F1-C interface related to control plane signaling, via F1-U interface related to user plane signaling for communication between CU and DU, and via E1 for communication between CU-UP and CU-CP.

The E1 interface is a logical interface. It supports the exchange of signaling information between the endpoints. From a logical standpoint, the E1 is a point-to-point interface between a gNB-CU-CP and a gNB-CU-UP. The E1 interface enables exchange of WCD associated information and non-WCD associated information. The E1 interface is a control interface and is not used for user data forwarding.

Figure 8:
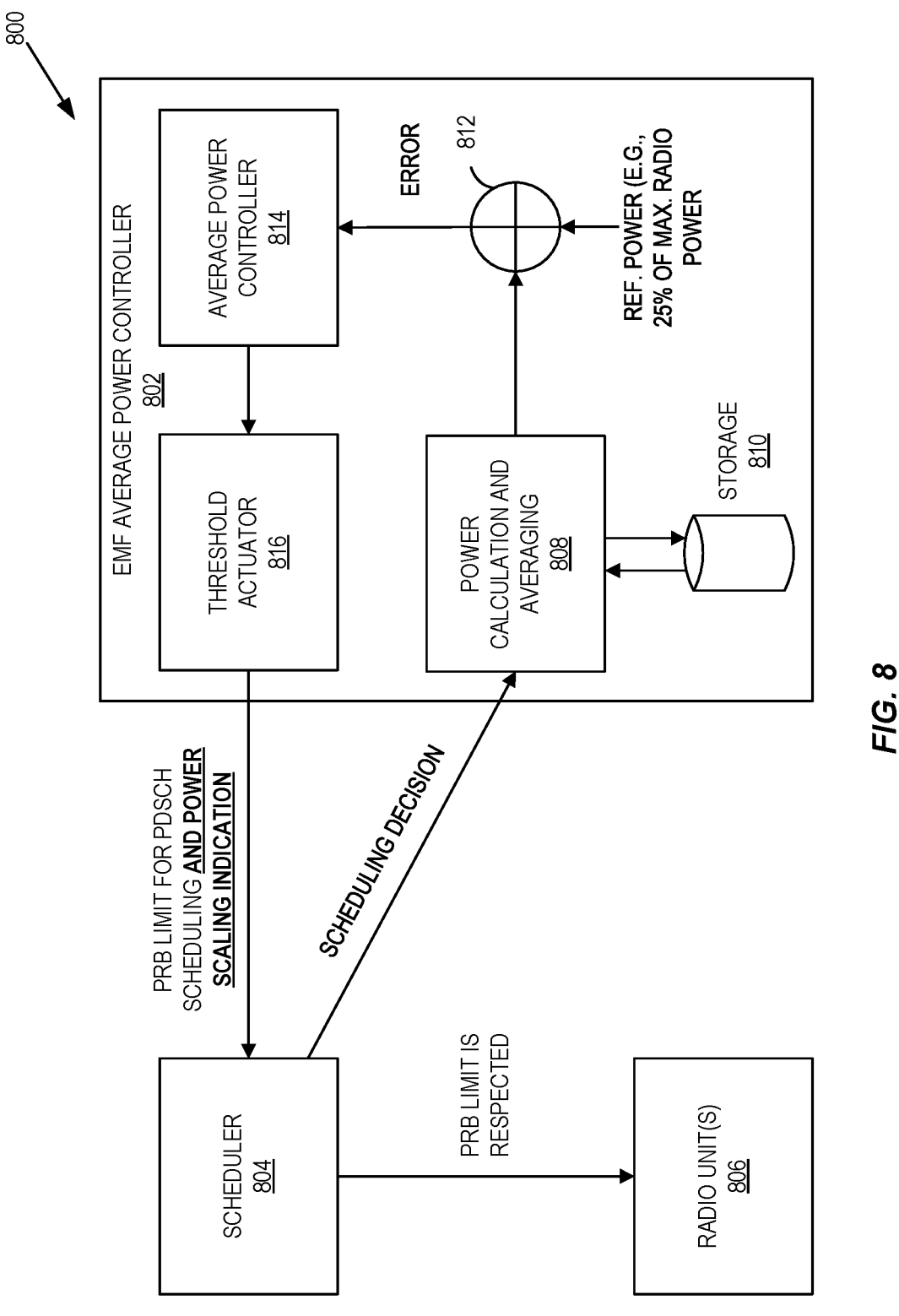
FIG. 8 illustrates one example of a network node that includes an average power control scheme that utilized both a Physical Resource Block (PRB) scheduling limit for data traffic scheduling (e.g., Physical Downlink Shared Channel (PDSCH) scheduling) and power-scaling (i.e., power deboosting) to reduce time-averaged power levels of the RAN node to a predetermined threshold level needed to obtain a certain RF EMF exclusion zone, while having a minimum impact on throughput performance, in accordance with embodiments of the present disclosure

FIG. 8 illustrates one example of a network node 800 that includes an EMF average power controller 802 in accordance with embodiments of the present disclosure. The network node 800 may be, for example, a base station 602 (e.g., a gNB 700) or a network node that implements part of the functionality of the base station 602 (e.g., gNB-DU 708). As illustrated, the network node 800 includes the EMF average power controller 802, a scheduler 804, and a radio unit(s) 806. As described below in detail, the EMF average power controller 802 determines a PRB limit (sometimes referred to herein as a "recommended PRB limit") per control period (e.g., 0.6 seconds) for an associated cell served or controlled by the network node 800 and provides the PRB limit to the scheduler 804. In addition, in some embodiments, the EMF average power controller 802 determines whether power scaling (i.e., power de-boosting) should be applied and provides a power scaling indication to the scheduler 804 together with the PRB limit. In one embodiment, the power scaling indication is an indication of whether a predefined or preconfigured power scaling (e.g., power de-boosting by a factor of X dB, where X may be, e.g., 3) should be applied. In another embodiment, the power scaling indication is an indication of an amount of power scaling to be applied (e.g., power de-boosting by a factor of X dB, where X=0 indicates no power scaling and X equal to some non-zero value indicates power de-boosting by a factor of X dB).

In operation, a power calculation and averaging function 808 computes, for each TTI (or slot), a total transmit power value for that TTI, based on scheduling information received from the scheduler 804 for that TTI. The scheduling information may include, for example, information that indicates an amount of resources (e.g., number of REs) scheduled, or allocated, for data (e.g., PDSCH in this example) for a respective TTI. Note that, in some embodiments, the amount of resources indicated by the scheduling information may be compensated at the scheduler 804 to compensate for power scaling applied by the scheduler, if any. This is beneficial where, for example, the EMF average power controller 802 sends a power scaling indication that indicates that power scaling is to be applied, but the scheduler 804 decides not to apply power scaling, e.g., due to a determination that the WCDs 612 served by the associated cell are predominantly cell-edge WCDs (i.e., the cell is cell-edge centric). Based on the scheduling information for each TTI, the power calculation and averaging function 808 computes the total transmit power for each TTI, stores the computed total transmit power values in storage 810, and then computes the average total transmit time for an associated period of time (e.g., over multiple control periods, each including many TTIs) by averaging the stored total transmit power values. A subtractor 812 computes an error as a difference between the computed average total transmit power and a reference average total transmit power.

An average power controller 814, which is one embodiment is a PD controller, generates a control signal based on the error. A threshold actuator 816 then outputs a (recommended) PRB limit for the control period based on the control signal from the average power controller 814. In some embodiments, the threshold actuator 816 also provides a power scaling indication that indicates whether power scaling (i.e., power de-boosting is to be applied). In one embodiment, the power scaling indication indicates that power scaling is to be applied if a trigger for a hard limit (e.g., the PRB limit is initially computed as being equal to or less than a predefined or preconfigured minimum PRB threshold). As discussed below in detail, if power scaling is to be applied, the initial PRB limit is adjusted (e.g., scaled) in proportion to the amount of power scaling to be applied. As described below, the scheduler 804 determines whether to apply the recommended PRB limit or some modified PRB limit and whether to apply power scaling based on the recommended PRB limit and, in some embodiments, the power scaling indication received from the EMF average power controller 802, and the scheduler 804 then operates to schedule data for transmission and provide the scheduled data to the radio unit(s) 806 for transmission.

In some embodiments, the PRB limit and power scaling indication are determined per control step (i.e., per control period). In this regard, when power scaling is to applied to data traffic (e.g., PDSCH), cell edge WCDs 612 (i.e., WCDs that are located near the cell edge) will be impacted. So, if a control step is associated a large number of cell edge WCDs 612, the scheduler 804 decides that power scaling is not to be applied even if the EMF average power controller 802 has provided a power scaling indication that indicates that power scaling is to be used. Instead, the scheduler 804 may decide to apply the PRB limitation without using power scaling.

Figure 9:
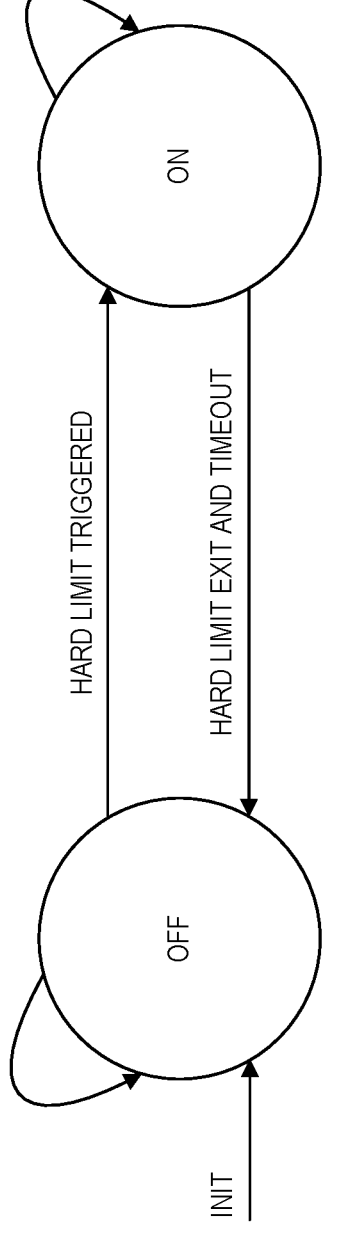
FIG. 9 is a state diagram that illustrates the operation of the EMF average power controller of FIG. 8 in accordance with one example embodiment of the present disclosure.

FIG. 9 is a state diagram that illustrates the operation of the EMF average power controller 802 in accordance with one example embodiment of the present disclosure. In this embodiment, the EMF average power controller 802 operates in either a non-power-scaling state (i.e., the "OFF" state of FIG. 9) or a power-scaling state (i.e., the "ON" state of FIG. 9). As illustrated, the EMF average power controller 802 starts (i.e., in initialized in) the non-power-scaling state and transitions to the power scaling state upon the occurrence of a triggering event, which in this example is reach a hard limit for the PRB limit (i.e., an initial PRB limit determined by the EMF average power controller 802 being less than or equal to a predefined or preconfigured minimum PRB limit, which may be a minimum amount of PRBs needed for operation of the respective cell).

Once in the power-scaling state, the EMF average power controller 802 remains in the power-scaling state until the triggering event (e.g., the hard limit) no longer exists and a predefined or preconfigured amount of time has elapsed (e.g., a predefined or preconfigured timer has expired since entering the power-scaling state). As discussed below in detail, when in the power-scaling state, the initial PRB limit determined by the EMF average power controller 802 is adjusted (i.e., increased) by an amount that is proportional to the amount of power scaling (i.e., power de-boosting to be applied). For example, if the amount of power scaling to be applied is a power de-boosting of X dB (e.g., 3 dB), then the initial PRB limit is scaled by a factor of X (e.g., adjusted PRB limit=initial PRB limit*X). The EMF average power controller 802 then provides the adjusted PRB limit and a power scaling indication that indicates that power scaling is to be applied to the scheduler 804.

er_use state is be exited (i.e., the EMF average power controller 802 transitions based to the non-power-scaling state). In this case, the PRB limit is derived from gamma directly without any adjustment. One example of this is represented by the following pseudo-code:

```
If gamma > gamma_low and EMF_powr_use = = 1 and TIMEOUT_count = = 0
    Power_deboost = 0;
    PRBlimit = gamma;
    Send power_deboost and PRBlimit to Scheduler;
Endif
```

Figure 10A:
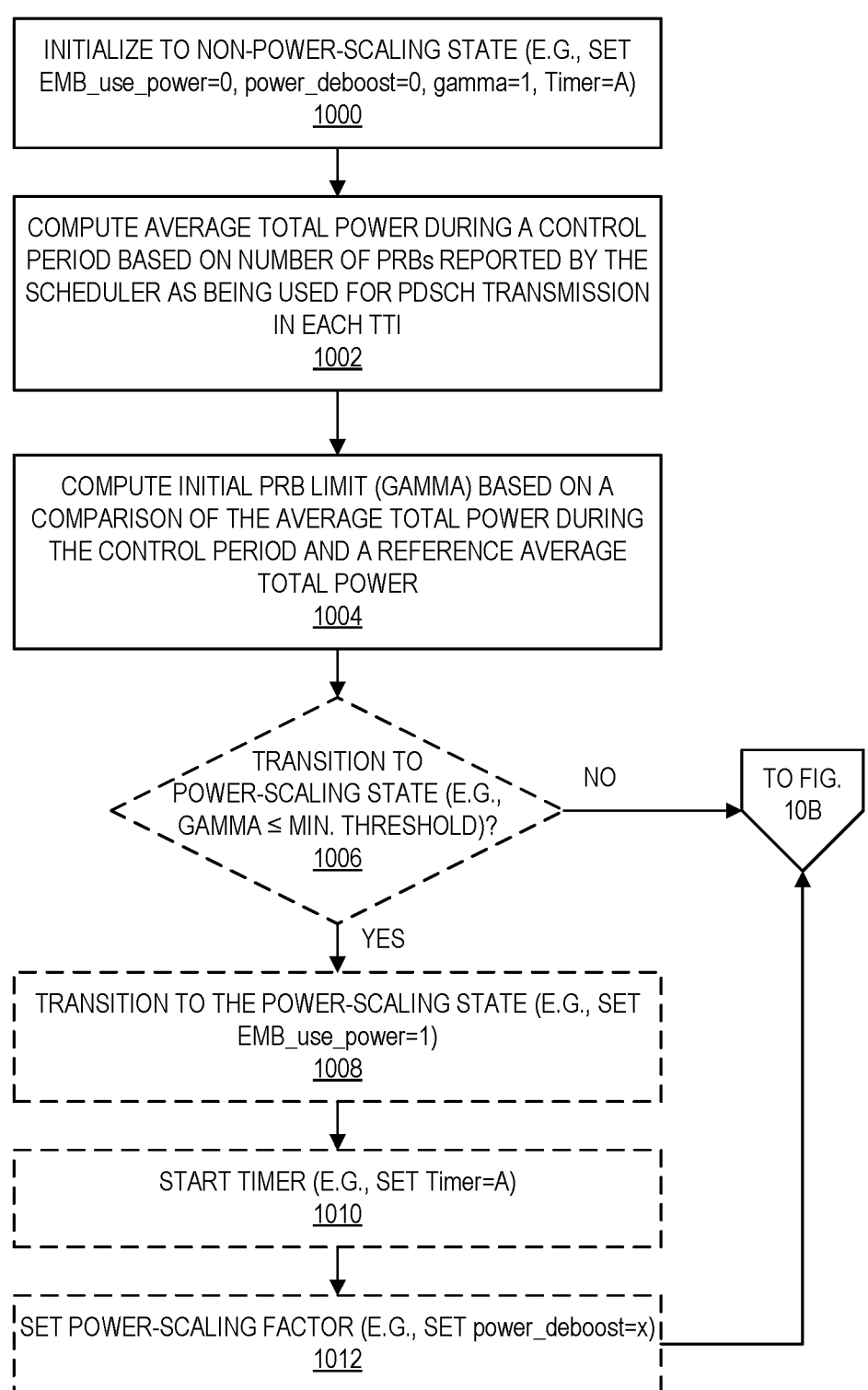
FIGS. 10A and 10B are a flow chart that illustrates the operation of the EMF average power controller of FIG. 8 in accordance with one embodiment of the present disclosure.
Figure 10B:
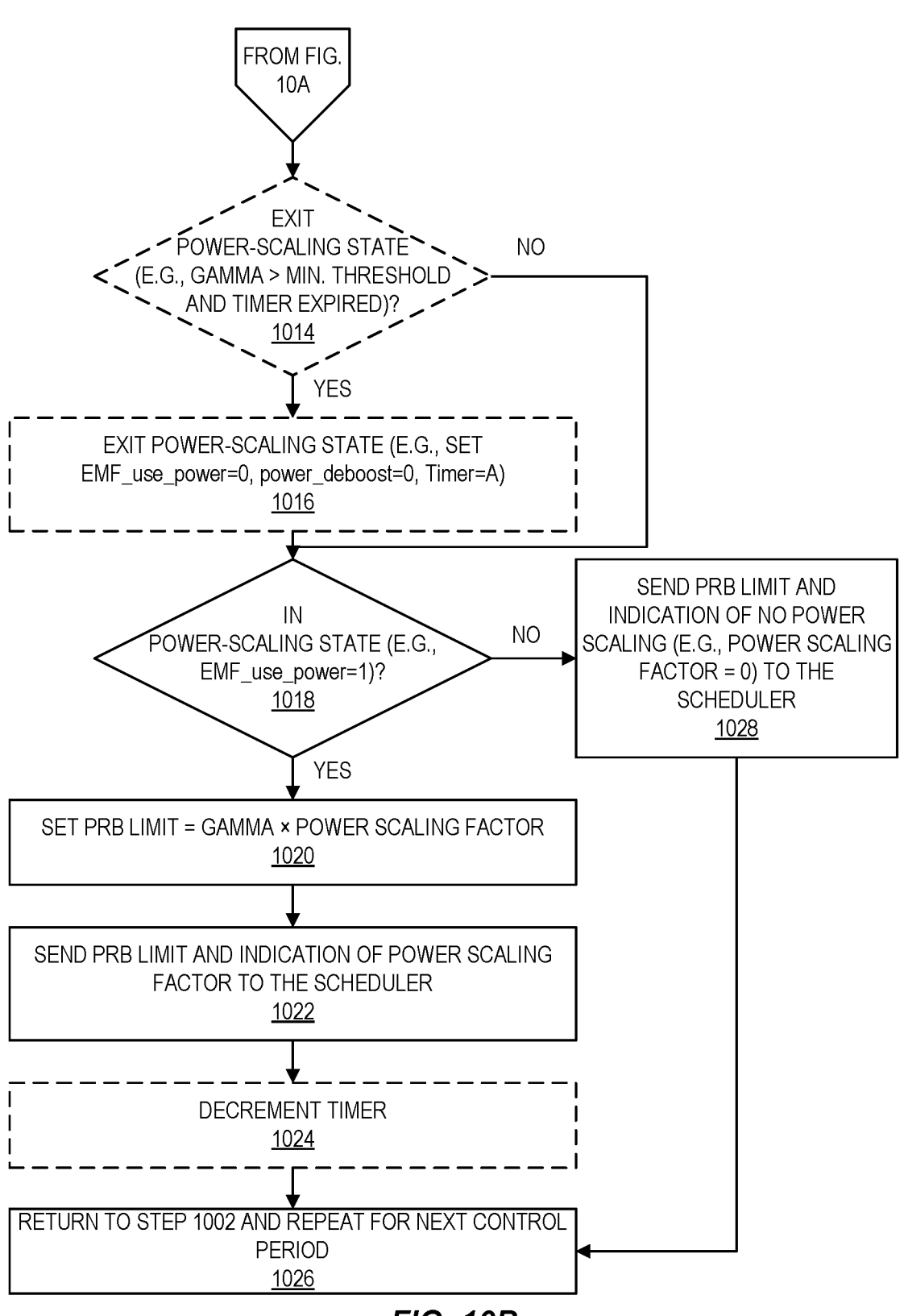

One example of the operation of the EMF average power controller 802 in accordance with the state diagram of FIG. 9 is as follows:

Entrance to EMF power scaling state (from OFF to ON)
  At the actuator algorithm of the average power controller, if the hard limit condition is met, the state (referred to here as "EMF_power_use state") change to TRUE (i.e., power-scaling state). In the power-scaling state, the EMF average power controller 802 sets the power scaling indication (referred to here as a "Power_deboost" parameter) to indicate that power scaling (i.e., power de-boosting) is to be used and the PRB limit is adjusted accordingly. One example of how the EMF average power controller 802 operates to enter the power-scaling state is represented by the following pseudo-code, where "gamma" is a parameter that represents an initial PRB limit determined by the EMF average power controller 802 based on the error between the computed total average power and the reference total average power as a percentage of a total number of PRBS in the bandwidth of the respective cell and "gamma_low" is the hard limit which in this case is the minimum PRB limit:

FIGS. 10A and 10B are a flow chart that illustrates the operation of the EMF average power controller 802 in accordance with one embodiment of the present disclosure. Note that optional steps are represented by dashed lines/boxes. As illustrated, the EMF average power controller 802 is initialized to, in this example, the non-power-scaling state (e.g., set EMF_power_use=0, power_deboost=0, gamma=1, Timer=A) (step 1000). The EMF average power controller 802 computes average total transmit power during a control period based on a number of PRBs, or REs, reported by the scheduler 804 as being used for, in this example, PDSCH transmission in each TTI of the control period (step 1002). The EMF average power controller 802 computes an initial PRB limit (gamma) based on a comparison of (i.e., error between) the computed average total transmit power and the reference average total transmit power (step 1004).

The EMF average power controller 802 determines whether to transition to the power-scaling state (step 1006). In one embodiment, the EMF average power controller 1002 determines that it is to transition to the power-scaling state if it is currently in the non-power-scaling state and the

```
EMF_power_use = 0; TIMEOUT_count = 0; Power_deboost = 1; // Initialize
If gamma <= gamma_low and EMF_power_use = = 0
    Power_deboost = x;              // x is the amount of power reduction as # of dB,
                                   // such as e.g., 3
    PRBlimit = gamma * x;          // PRB increase by x
    Send Power_deboost and PRBlimit to Scheduler
    EMF_power_use = 1;
    TIMEOUT_count = A;             // A is a predefined constant, such as 0 or 2
Endif
```

Staying in EMF Power Scaling ON State
  The EMF_power_use state is maintained at least during a minimum amount of time (TIMEOUT_count=A) to avoid a ping-pong effect. One example of this is represented by the following pseudo-code:

```
If EMF_power_use = = 1 and TIMEOUT_count != 0
    Power_deboost = x;
    PRBlimit = gamma * x;
    Send Power_deboost and PRBlimit to Scheduler
    TIMEOUT_count--;
Endif
```

Exit EMF Power Scaling ON State
  Once the gamma value is high enough (e.g., greater than to a predefined threshold such as the PRB limit value that is greater than the hard limit) and the minimum time period has elapsed, the EMF_powcomputed initial PRB limit is less than a predefined or preconfigured minimum PRB threshold. If the EMF average power controller 802 determines that it is not to transition to the power-scaling state, the procedure proceeds to step 1014. However, if the EMF average power controller 802 determines that it is to transition to the power-scaling state, the EMF average power controller 802 transitions to the power-scaling state, starts a timer, and sets a power-scaling factor to a desired power-scaling factor value (step 1008). For example, the EMF average power controller 802 sets the parameter EMB_use_power=1, sets Timer=A, and sets power_deboost=X where X is the desired power-scaling factor, as in the example pseudo-code above.

Whether proceeding from the "NO" branch of step 1006 or from step 1012, the EMF average power controller 802 determines whether to exit the power-scaling state (step 1014). For example, using the associated example pseudo-code above, the EMF average power controller 802 determines that it is to exit the power-scaling state if it is in the power-scaling state, the initial PRB limit (denoted as "gamma") is greater than the predefined or preconfigured minimum gamma threshold, and the timer has expired. If it is to exit the power-scaling state (step 1014, YES), the EMF average power controller 802 exists the power-scaling state and thus enters the non-power-scaling state (step 1016). For example, the EMF average power controller 802 sets the parameter EMF_power_use=0, sets Timer=A, and sets power_deboost=0 in the example pseudo-code above.

Whether proceeding from the "NO" branch of step 1014 or from step 1016, the EMF average power controller 802 determines whether it is in the power-scaling state (step 1018). If in the power-scaling state (step 1018, YES), the EMF average power controller 802 adjusts the PRB limit by, in this example, setting the PRB limit equal to the initial PRB limit (denoted "gamma") computed in step 1004 times the power scaling factor (i.e., PRB limit=gamma*power_deboost) (step 1020). For example, the power scaling factor is 3 dB, then the adjusted PRB limit is equal to three times the initial PRB limit computed in step 1004. The EMF average power controller 802 then sends the adjusted PRB limit to the scheduler 804 as the recommended PRB limit and also sends a power scaling indication to the scheduler 804 that indicates that power scaling is to be used (i.e., recommends power scaling) (step 1022). In one embodiment, the power scaling indication indicates that power scaling is to be used, and the scheduler 804 has knowledge of the power scaling factor. In another embodiment, the power scaling indicating indicates the power scaling factor to be used. The EMF average power controller 802 decrements the timer (step 1024). The procedure then returns to step 1002 and repeats for the next control period (step 1026).

Returning to step 1018, if the EMF average power controller 802 is in the non-power scaling state (step 1018, NO), the EMF average power controller 802 sends the initial PRB limit to the scheduler 804 as the recommended PRB limit and also sends a power scaling indication to the scheduler 804 that indicates that no power scaling is to be used (i.e., recommends no power scaling) (step 1028) and the procedure then returns to step 1002 and repeats for the next control period (step 1026).

As a result of the procedure of FIGS. 10A and 10B, the scheduler 804 receives the PRB limit and power scaling indication from the EMF average power controller 802. In one embodiment, the scheduler 804 simply applies the PRB limit and applies power scaling in accordance with the power scaling indication. However, doing so may result in less than optimal performance, particularly if the respective cell is what is referred to herein as "cell edge WCD centric". Thus, in one embodiment, for each control step, the percentage of WCDs 612 in the respective cell that are at or near the cell edge is determined. This value is used in a future control step (e.g., used in the next control step to determine whether to follow the recommendation from the EMF average power controller 802 to apply power scaling). Determining the percentage of WCDs 612 in the respective cell that are cell-edge WCDs is, in one embodiment, implemented inside scheduler 804.

Figure 11:
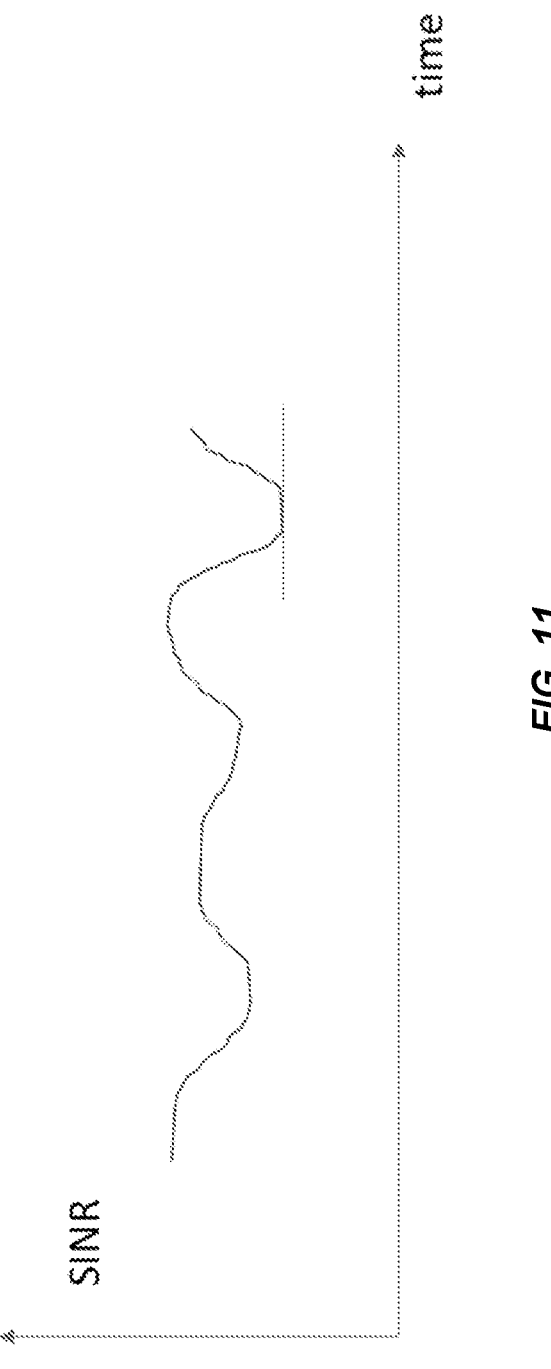
FIG. 11 illustrate one example of how a Signal to Interference plus Noise Ratio (SINR) threshold can be utilized to identify a cell-edge wireless communication device (WCD), in accordance with one embodiment of the present disclosure.

In one embodiment, a cell-edge WCD is defined by the validity of the condition:

minimum SINR<SINRthreshold throughout the entire WCD session per control step as shown in FIG. 11. The value of "SINRthreshold" is a predefined constant. Further, a cell-edge rate parameter, CE_Rate(n), is defined as the ratio between the total number of cell edge WCDs in the respective cell and the total number of WCDs 612 in the respective cell within the n-th control step. An average cell edge WCD rate for the n-th control step is obtained by the following formula which considers the average cell edge WCD rate for the previous control step (i.e., control step n−1):

$$Ave\_CE\_Rate(n) = alpha * Ave\_CE\_Rate(n-1) + (1-alpha) * CE\_Rate(n)$$

where alpha is a predefined constant less than 1 and greater than 0. If Ave_CE_Rate(n)>y where Y is a predefined constant, this indicates that the respective cell is a "cell-edge WCD centric" cell. In one embodiment, the scheduler 804 does not apply power scaling if the respective cell is cell-edge WCD centric, even if the power scaling indication received from the EMF average power controller indicates that power scaling is to be applied.

FIG. 12 is a flow chart that illustrates the operation of the scheduler 804 in accordance with one embodiment of the present disclosure. Note that optional steps are represented by dashed lines/boxes. As illustrated, the scheduler 804 receives the PRB limit and the power scaling indication from the EMF average power controller 802 (step 1200). The PRB limit is sometimes referred to herein as a "recommended PRB limit", and this power scaling indication is sometimes referred to herein as providing a recommendation of whether to apply power scaling. The scheduler 804 determines whether power-scaling is needed (recommended) based on the received power scaling recommendation (step 1202). The scheduler 804 also determines whether the respective cell is cell-edge centric, as described above (steps 1204 and 1210).

If the power scaling indication received from the EMF average power controller 802 indicates that power scaling is to be applied and the respective cell is not cell-edge centric, the scheduler 804 follows the received PRB limit and power scaling indication (step 1206). In other words, the scheduler 804 applies the received PRB limit when performing scheduling for the respective cell and applies (or causes the RAN node to apply) power scaling. The scheduler (or associated RAN node) may also apply a link adaptation (LA) adjustment that compensates for the power scaling by, e.g., adjusting SINR to account for the power scaling.

Conversely, if the power scaling indication received from the EMF average power controller 802 indicates that power scaling is to be applied and the respective cell is cell-edge centric, the scheduler 804 does not follow the recommendation to apply power scaling and modifies the received PRB limit to account for the fact that power scaling will not be applied (step 1208). For example, since power scaling was recommended by the EMF average power controller 802, the received PRB limit was generated at the EMF average power controller 802 by scaling the initial PRB limit by the power scaling factor. Thus, at the scheduler 804, this adjustment to the initial PRB limit can be undone by applying the multiplicative inverse of the power scaling factor to the received PRB limit (e.g., if the power scaling factor is 3, then the adjusted PRB limit at the scheduler is equal to the received PRB limit divided by 3). The scheduler 804 then performs scheduling using the adjusted PRB limit (e.g., received PRB limit divided by the power scaling factor) and does not apply power scaling.

If the power scaling indication received from the EMF average power controller 802 indicates that power scaling is not to be applied and the respective cell is not cell-edge centric, the scheduler 804 may nevertheless use power scaling. Thus, in one embodiment, if the power scaling indication received from the EMF average power controller 802 indicates that power scaling is not to be applied and the respective cell is not cell-edge centric, the scheduler 804 applies power scaling (or causes the RAN node 800 to apply power scaling) even though the received power scaling indication indicated no power scaling and modifies the PRB limit in proportion to the applied power scaling (e.g., PRB limit=received PRB limit*power scaling factor) (step 1212). In addition, the scheduler 804 may apply a LA adjustment to compensate for the applied power scaling.

If the power scaling indication received from the EMF average power controller 802 indicates that power scaling is not to be applied and the respective cell is cell-edge centric, the scheduler 804 does not apply power scaling in accordance with the received power scaling indication and applies the received PRB limit from the EMF average power controller 802 (step 1214).

The scheduler 804 then reports the number of PRBs or REs scheduled for each TTI in the respective control period or a scaled version thereof to the EMF average power controller 802 (step 1216). More specifically, if the received power scaling indication in step 1200 indicates that power scaling should be used but the respective cell is cell-edge centric, power scaling is not applied and the scheduler 804 decreases the PRB limit (e.g., applied PRB limit=the recommended PRB limit received in step 1200 divided by the power scaling factor), as described above with respect to step 1208. In this case, the number of PRBs or REs reported to the EMF average power controller 802 for each TTI is scaled by the power scaling factor (e.g., reported number of PRBs=actual number of PRBs scheduled for the TTI*the power scaling factor). Alternatively, the scheduler 804 may report the actual number of scheduled PRBs or RES and also send an indication to the EMF average power controller 802 that power scaling was not applied, where appropriate scaling is then applied at the EMF average power controller 802.

Likewise, if the received power scaling indication in step 1200 indicates that power scaling should not be used but the respective cell is not cell-edge centric, power scaling is applied and the scheduler 804 increases the PRB limit (e.g., applied PRB limit=the recommended PRB limit received in step 1200 times the power scaling factor), as described above with respect to step 1212. In this case, the number of PRBs or REs reported to the EMF average power controller 802 for each TTI is scaled by the power scaling factor (e.g., reported number of PRBs=actual number of PRBs scheduled for the TTI divided by the power scaling factor). Alternatively, the scheduler 804 may report the actual number of scheduled PRBs or REs and also send an indication to the EMF average power controller 802 that power scaling was applied, where appropriate scaling is then applied at the EMF average power controller 802.

Otherwise, if the scheduler 804 follows the PRB limit recommendation and the power scaling/no power scaling recommendation of the EMF average power controller 802 (i.e., step 1206 or 1214), the scheduler 804 reports the actual number of scheduled PRBs or REs for each TTI to the EMF average power controller 802.

Note that the process of FIG. 12 is repeated by the scheduler 804 for each control period (i.e., for each control step).

In the embodiments described above, the EMF average power controller 802 operates in either a power-scaling state or a non-power-scaling state. Now, the description turns to embodiments in which the scheduler 804, rather than the EMF average power controller 802, operates in either a power-scaling state or a non-power-scaling state. By implementing these states in the scheduler 804, the PRB limit and power scaling can be controlled on a per TTI basis. It is important to note that, for this embodiment, the EMF average power controller 802 does not generate or send a power scaling indication and does not adjust the PRB limit to account for power scaling. In other words, the EMF average power controller 802 for this embodiment can be understood as operating in accordance with steps 1000, 1002, 1004, and 1028 of FIGS. 10A and 10B.

Figure 13:
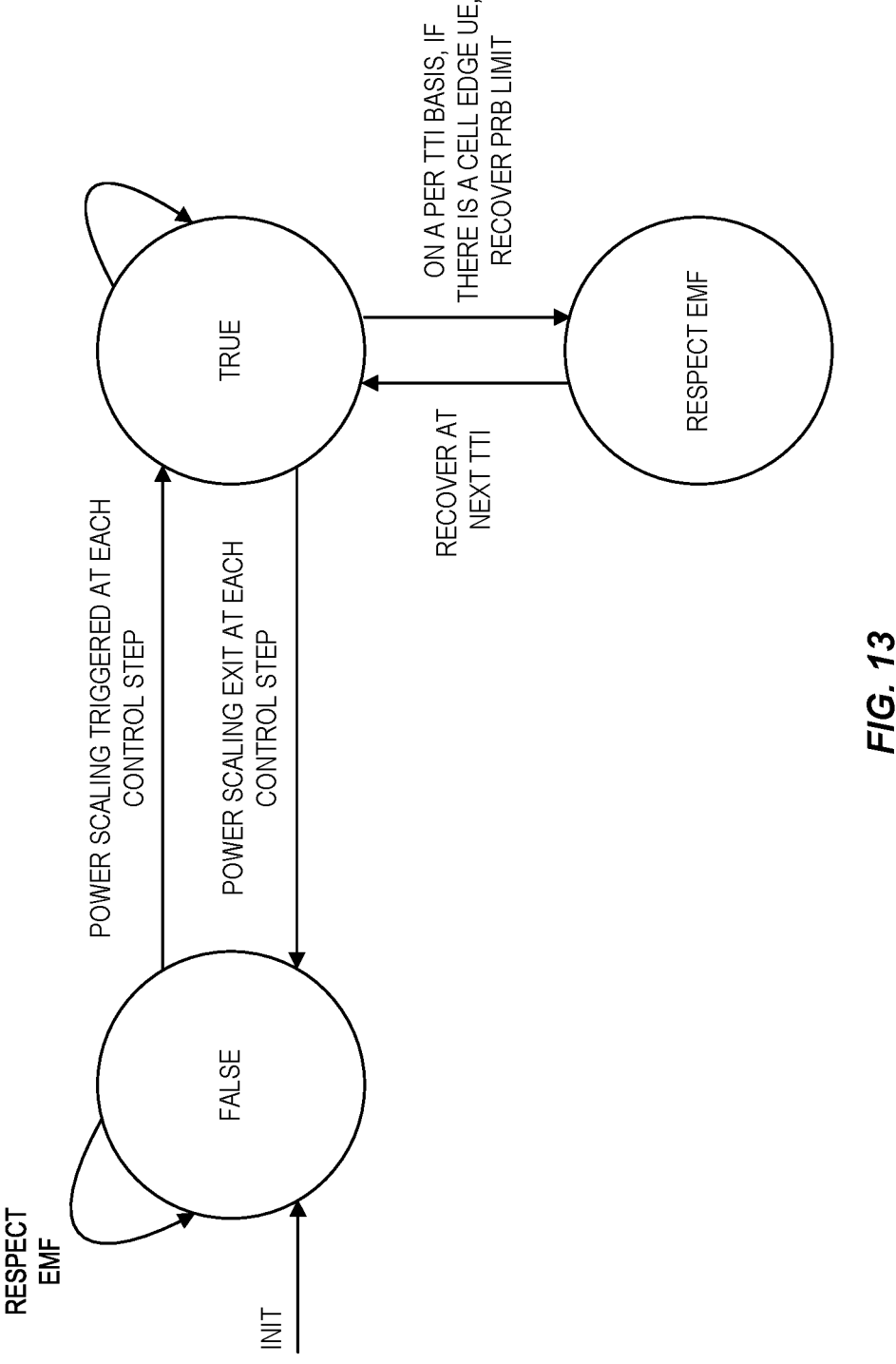
FIG. 13 is a state diagram for the scheduler of FIG. 8 in which the scheduler operates in either a power-scaling state or a non-power-scaling state in accordance with another embodiment of the present disclosure.

In this regard, FIG. 13 is a state diagram for the scheduler 804 in accordance with one embodiment of the present disclosure. As illustrated, the scheduler 804 is initialized in the non-power-scaling state (i.e., the power scaling="FALSE" state). In the non-power-scaling state, the scheduler 804 applies the PRB limit received from the EMF average power controller 802.

Upon receiving a PRB limit for a control period from the EMF average power controller 802 that is less than or equal to a predefined or preconfigured minimum PRB threshold, the scheduler 804 transitions to the power-scaling state (i.e., the power scaling="TRUE" state). While in this state, for each TTI, the scheduler 804 adjusts the PRB limit in proportion to an amount of power scaling to be applied. In one example, the power scaling is power de-boosting, the amount of power scaling to be applied is defined by a power scaling factor X, and the PRB limit is increased by the power scaling factor X (i.e., adjusted PRB limit=received PRB limit*power scaling factor). For each TTI, the amount of PRBs or REs reported to the EMF average power controller 802 as the amount of resources scheduled for the TTI (for PDSCH) is reduced by the power scaling factor (i.e., reported number of PRBs (or REs)=actual number of PRBs (or REs) scheduled for PDSCH traffic divided by the power scaling factor).

Figure 14:
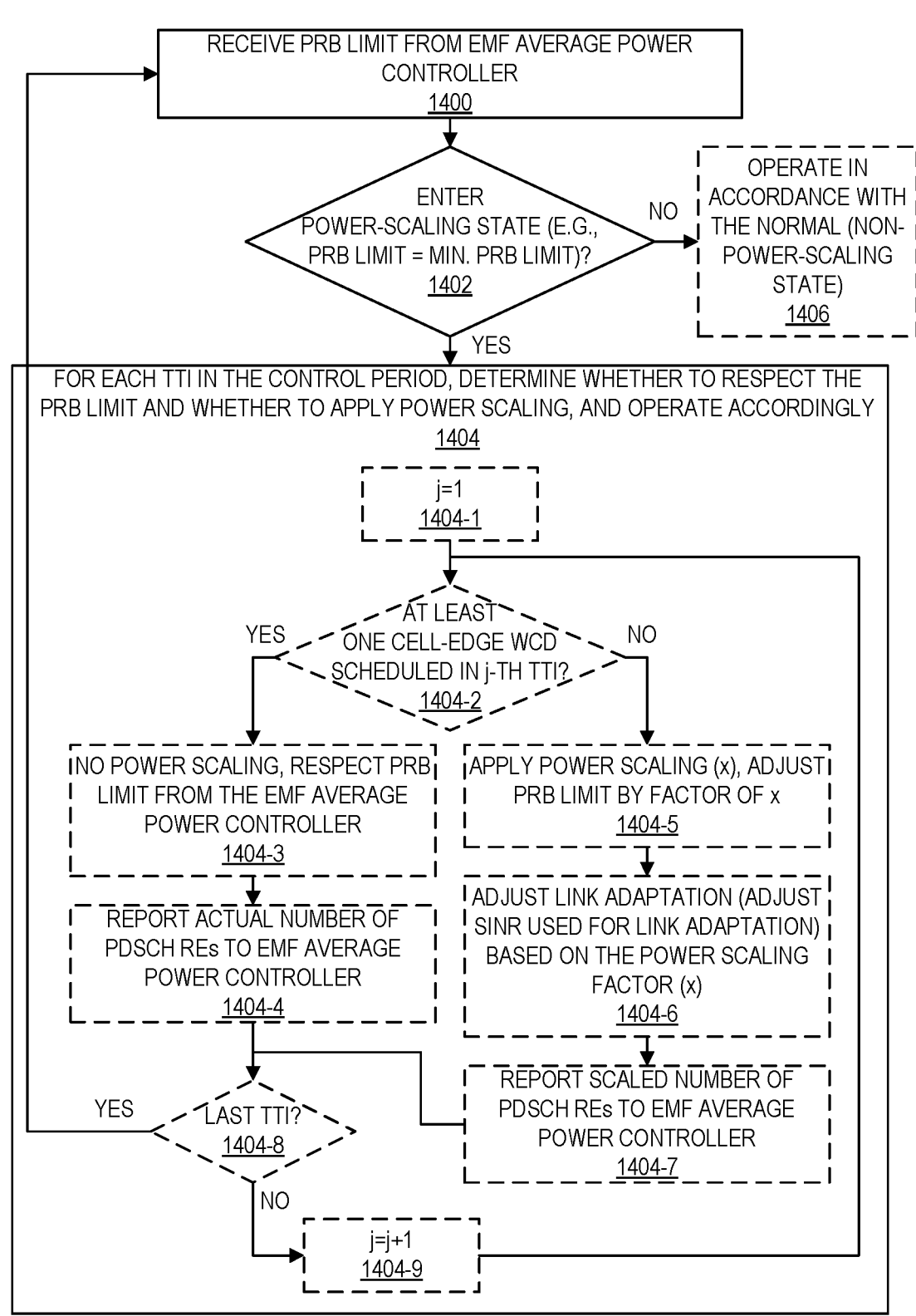
FIG. 14 is a flow chart that illustrates the operation of the scheduler of FIG. 8 in which the scheduler operates in either a power-scaling state or a non-power-scaling state in accordance with one embodiment of the present disclosure.

FIG. 14 is a flow chart that illustrates the operation of the scheduler 804 in accordance with the embodiment described above. Optional steps are represented by dashed lines/boxes. As illustrated, the scheduler 804 receives a PRB limit for a control period from the EMF average power controller 802 (step 1400). The scheduler 804 decides whether to enter the power-scaling state based on the received PRB limit (step 1402). For example, if the received PRB limit is less than or equal to a predefined or preconfigured minimum threshold amount of PRBs (e.g., minimum amount of PRBs needed for operation of the respective cell), the scheduler 804 decides to enter the power-scaling state.

If the scheduler 804 decides to operate in the power-scaling state (step 1402, YES), for each TTI, the scheduler 1402 determines whether to respect the PRB limit received from the EMF average power controller 802, determines whether to apply power scaling, and operates accordingly (step 1404). More specifically, in one example embodiment, a TTI index (j) is set to 1 (step 504-1). The scheduler 804 determines whether at least one WCD to be scheduled in the j-th TTI is a cell-edge WCD (step 1404-2). Note that, for cell edge WCD, more power is needed instead of more PRBS. Thus, in step 1404-2, before LA, the scheduler 804 check all the WCDs 612 to be scheduled for the j-th TTI to determine whether at least one of those WCDs is a cell-edge WCD. Here, as an example, a WCD is determined to be a cell-edge WCD when CQI is less than A (a predefined constant) and outer loop adjustment (OLA) is less than B (a constant).

If at least one WCD to be scheduled in the j-th TTI is a cell-edge WCD, no power scaling is applied, and the scheduler 804 applies the PRB limit received from the EMF average power controller 802 (step 1404-3). The scheduler 804 reports the actual number of PRBs or REs scheduled for PDSCH in the j-th TTI to the EMF average power controller 802 (step 1404-4).

Returning to step 1402-2, if there are no cell-edge WCDs scheduled in the j-th TTI (step 1404-2, NO), the scheduler 804 enters the power-scaling state for the j-th TTI such that the scheduler 804 applies (or causes the RAN node 800 to apply) power scaling and adjust the PRB limit in proportion to the power scaling factor (e.g., adjusted PRB limit=received PRB limit*power scaling factor) (step 1404-5). The scheduler 804 adjusts (or causes the RAN node 800 to adjust) LA (e.g., adjust SINR used for LA) based on the applied power scaling factor (step 1404-6). The scheduler 804 reports a scaled number of PRBs or REs to the EMF average power controller 802 as the number of PRBs or REs scheduled for the TTI (step 1404-7). The scaled number of PRBs or RES is equal to the actual number of PRBs or REs scheduled for PDSCH in the j-th TTI divided by the power scaling factor.

Whether proceeding from step 1404-4 or 1404-7, the scheduler determines whether the j-th TTI is the last TTI in the control period (step 1404-8). If not, the TTI index (j) is incremented (step 1404-9) and the processed returns to step 1404-2. Once the last TTI is processed, the process returns to step 1400 and is repeated for the next control period.

In both the embodiment of operation of the scheduler 804 illustrated in FIG. 12 and the embodiment of the operation of the scheduler 804 illustrated in FIG. 14, the scheduler 804 may apply an adjustment to the LA in some scenarios. This LA adjustment may be beneficial because, due to power de-boosting, transmit power for PDSCH is reduced but transmit power for CSI-RS is not reduced. So, in this case, the WCD 612 may over-estimate rank because of the power discrepancy between PDSCH and CSI-RS because the WCD 612 is not aware of the power de-boosting applied for PDSCH. Thus, when power scaling (i.e., power de-boosting) is applied, a LA adjustment is applied such that LA is more conservative. In one embodiment, this is done by adjusting the SINR used for LA. More specifically, in one embodiment, for each TTI, the scheduler 804 applies (or causes the RAN node 800) to apply an SINR adjustment of X (equal to the amount of power de-boosting) inside link adaptation:

$$SINR = x + SINR\_INNER\_loop + OLA$$

where SINR_INNER_loop is a SINR derived from the Channel Quality Indication (CQI) reported by the WCD 612, OLA is an outer loop adjustment using Hybrid Automatic Repeat Request (HARQ) Acknowledgement (ACK)/Negative Acknowledgment (NACK).

If Rank>=2, and CQI<a predefined CQI threshold, i.e., the WCD 612 is a cell edge WCD, the scheduler 804 applies (or causes the RAN node 800 to apply) an additional SINR adjustment z (predefined constant):

$$SINR = x + z + INNER_{loop} + Outer_{loop}.$$

Figure 15:
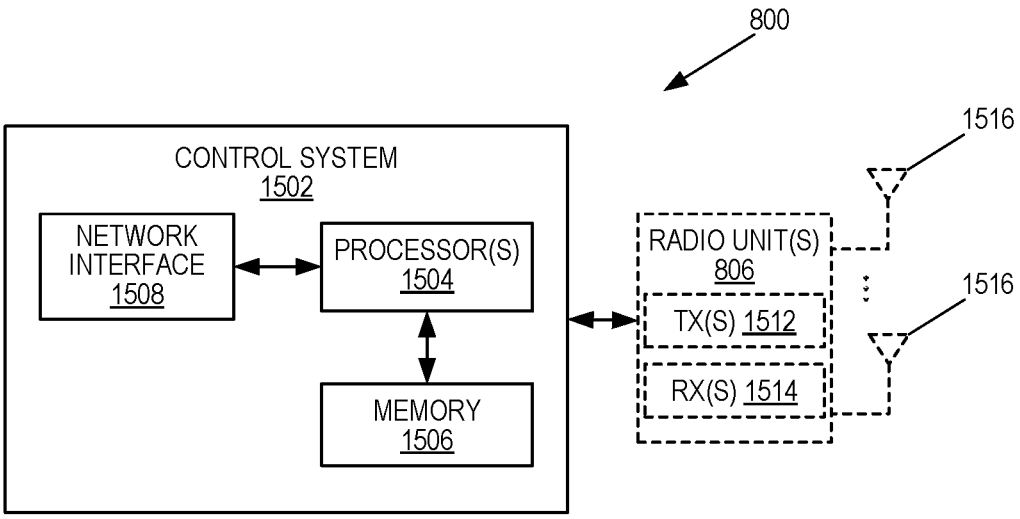
FIG. 15 is a schematic block diagram of a Radio Access Network (RAN) node according to some embodiments of the present disclosure.

FIG. 15 is a schematic block diagram of the RAN node 800 according to some embodiments of the present disclosure. Optional features are represented by dashed boxes. The RAN node 800 may be, for example, a base station 602 or 606 or a network node that implements all or part of the functionality of the base station 602 or gNB described herein. As illustrated, the RAN node 800 includes a control system 1502 that includes one or more processors 1504 (e.g., Central Processing Units (CPUs), Application Specific Integrated Circuits (ASICs), Field Programmable Gate Arrays (FPGAs), and/or the like), memory 1506, and a network interface 1508. The one or more processors 1504 are also referred to herein as processing circuitry. Note that, in one embodiment, the EMF average power controller 802 and the scheduler 804 are implemented in the control system 1502. In addition, the RAN node 800 may include the radio unit(s) 806, as described above. Each radio unit 806 includes one or more transmitters 1512 and one or more receivers 1514 coupled to one or more antennas 1516. The radio units 806 may be referred to or be part of radio interface circuitry. In some embodiments, the radio unit(s) 806 is external to the control system 1502 and connected to the control system 1502 via, e.g., a wired connection (e.g., an optical cable). However, in some other embodiments, the radio unit(s) 806 and potentially the antenna(s) 1516 are integrated together with the control system 1502. The one or more processors 1504 operate to provide one or more functions of a RAN node 800 as described herein. In some embodiments, the function(s) are implemented in software that is stored, e.g., in the memory 1506 and executed by the one or more processors 1504.

Figure 16:
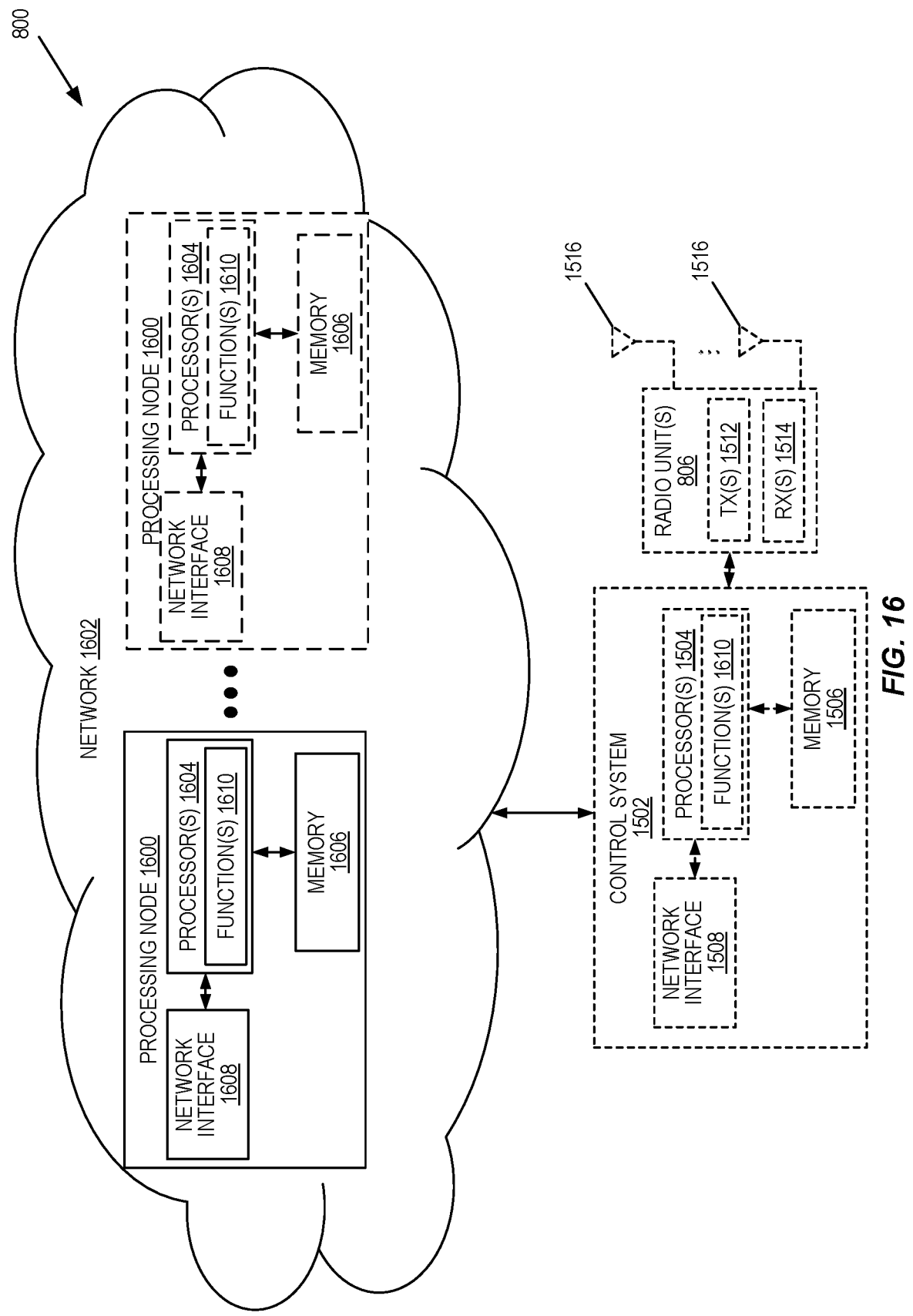
FIG. 16 is a schematic block diagram that illustrates a virtualized embodiment of the RAN node of FIG. 15 according to some embodiments of the present disclosure.

FIG. 16 is a schematic block diagram that illustrates a virtualized embodiment of the RAN node 800 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the RAN node 800 in which at least a portion of the functionality of the RAN node 800 is implemented as a virtual component(s) (e.g., via a virtual machine(s) executing on a physical processing node(s) in a network(s)). As illustrated, in this example, the RAN node 800 may include the control system 1502 and/or the one or more radio units 806, as described above. The control system 1502 may be connected to the radio unit(s) 806 via, for example, an optical cable or the like. The RAN node 800 includes one or more processing nodes 1600 coupled to or included as part of a network(s) 1602. If present, the control system 1502 or the radio unit(s) are connected to the processing node(s) 1600 via the network 1602. Each processing node 1600 includes one or more processors 1604 (e.g., CPUs, ASICS, FPGAs, and/or the like), memory 1606, and a network interface 1608.

In this example, functions 1610 of the RAN node 800 described herein are implemented at the one or more processing nodes 1600 or distributed across the one or more processing nodes 1600 and the control system 1502 and/or the radio unit(s) 806 in any desired manner. In some particular embodiments, some or all of the functions 1610 of the RAN node 800 described herein are implemented as virtual components executed by one or more virtual machines implemented in a virtual environment(s) hosted by the processing node(s) 1600. As will be appreciated by one of ordinary skill in the art, additional signaling or communication between the processing node(s) 1600 and the control system 1502 is used in order to carry out at least some of the desired functions 1610. Notably, in some embodiments, the control system 1502 may not be included, in which case the radio unit(s) 806 communicate directly with the processing node(s) 1600 via an appropriate network interface(s).

In some embodiments, a computer program including instructions which, when executed by at least one processor, causes the at least one processor to carry out the functionality of RAN node 800 or a node (e.g., a processing node 1600) implementing one or more of the functions 1610 of the RAN node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
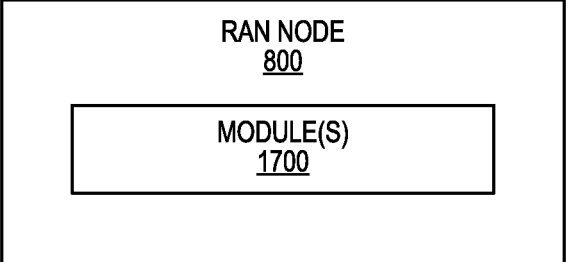
FIG. 17 is a schematic block diagram of the RAN node of FIG. 15 according to some other embodiments of the present disclosure.

FIG. 17 is a schematic block diagram of the RAN node 800 according to some other embodiments of the present disclosure. The RAN node 800 includes one or more modules 1700, each of which is implemented in software. The module(s) 1700 provide the functionality of the RAN node 800 described herein. This discussion is equally applicable to the processing node 1600 of FIG. 16 where the modules 1700 may be implemented at one of the processing nodes 1600 or distributed across multiple processing nodes 1600 and/or distributed across the processing node(s) 1600 and the control system 1502.

Figure 18:
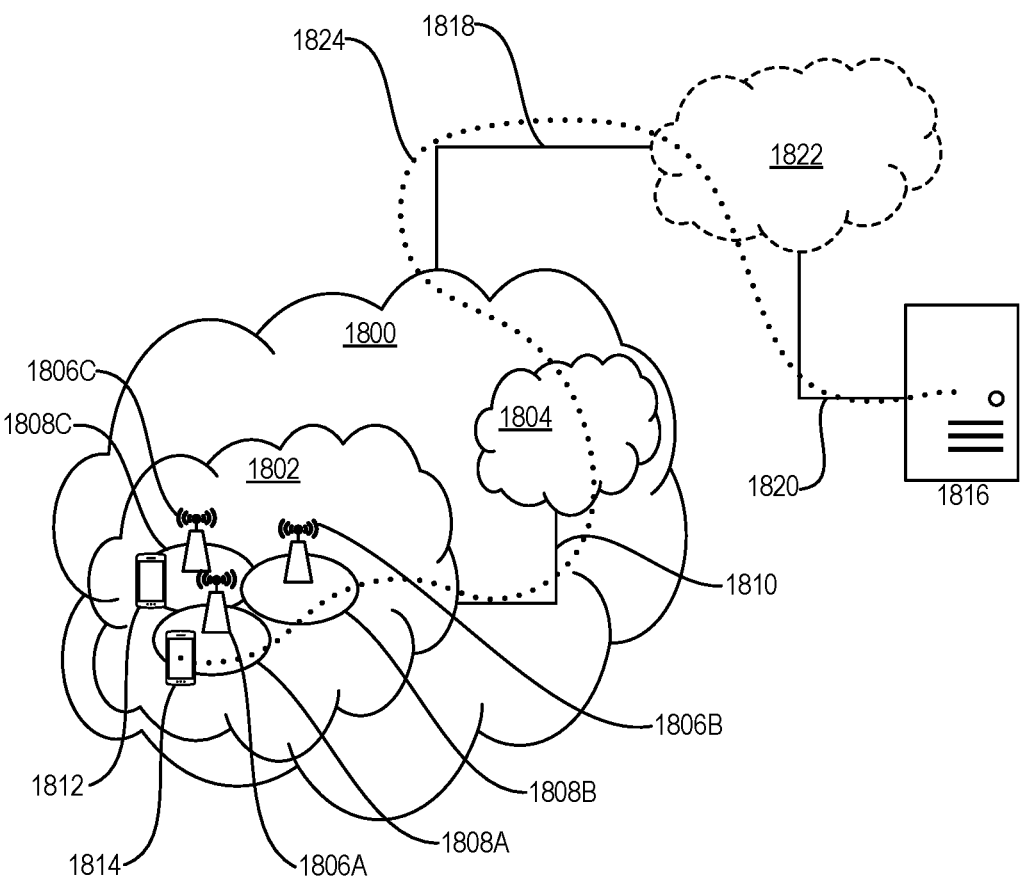
FIG. 18 illustrates a telecommunication network connected via an intermediate network to a host computer in accordance with some embodiments of the present disclosure.

With reference to FIG. 18, in accordance with an embodiment, a communication system includes a telecommunication network 1800, such as a 3GPP-type cellular network, which comprises an access network 1802, such as a RAN, and a core network 1804. The access network 1802 comprises a plurality of base stations 1806A, 1806B, 1806C, such as Node Bs, eNBs, gNBs, or other types of wireless Access Points (APs), each defining a corresponding coverage area 1808A, 1808B, 1808C. Each base station 1806A, 1806B, 1806C is connectable to the core network 1804 over a wired or wireless connection 1810. A first UE 1812 located in coverage area 1808C is configured to wirelessly connect to, or be paged by, the corresponding base station 1806C. A second UE 1814 in coverage area 1808A is wirelessly connectable to the corresponding base station 1806A. While a plurality of UEs 1812, 1814 are illustrated in this example, the disclosed embodiments are equally applicable to a situation where a sole UE is in the coverage area or where a sole UE is connecting to the corresponding base station 1806.

The telecommunication network 1800 is itself connected to a host computer 1816, which may be embodied in the hardware and/or software of a standalone server, a cloud-implemented server, a distributed server, or as processing resources in a server farm. The host computer 1816 may be under the ownership or control of a service provider, or may be operated by the service provider or on behalf of the service provider. Connections 1818 and 1820 between the telecommunication network 1800 and the host computer 1816 may extend directly from the core network 1804 to the host computer 1816 or may go via an optional intermediate network 1822. The intermediate network 1822 may be one of, or a combination of more than one of, a public, private, or hosted network; the intermediate network 1822, if any, may be a backbone network or the Internet; in particular, the intermediate network 1822 may comprise two or more sub-networks (not shown).

The communication system of FIG. 18 as a whole enables connectivity between the connected UEs 1812, 1814 and the host computer 1816. The connectivity may be described as an Over-the-Top (OTT) connection 1824. The host computer 1816 and the connected UEs 1812, 1814 are configured to communicate data and/or signaling via the OTT connection 1824, using the access network 1802, the core network 1804, any intermediate network 1822, and possible further infrastructure (not shown) as intermediaries. The OTT connection 1824 may be transparent in the sense that the participating communication devices through which the OTT connection 1824 passes are unaware of routing of uplink and downlink communications. For example, the base station 1806 may not or need not be informed about the past routing of an incoming downlink communication with data originating from the host computer 1816 to be forwarded (e.g., handed over) to a connected UE 1812. Similarly, the base station 1806 need not be aware of the future routing of an outgoing uplink communication originating from the UE 1812 towards the host computer 1816.

Example implementations, in accordance with an embodiment, of the UE, base station, and host computer discussed in the preceding paragraphs will now be described with reference to FIG. 19. In a communication system 1900, a host computer 1902 comprises hardware 1904 including a communication interface 1906 configured to set up and maintain a wired or wireless connection with an interface of a different communication device of the communication system 1900. The host computer 1902 further comprises processing circuitry 1908, which may have storage and/or processing capabilities. In particular, the processing circuitry 1908 may comprise one or more programmable processors, ASICs, FPGAs, or combinations of these (not shown) adapted to execute instructions. The host computer 1902 further comprises software 1910, which is stored in or accessible by the host computer 1902 and executable by the processing circuitry 1908. The software 1910 includes a host application 1912. The host application 1912 may be operable to provide a service to a remote user, such as a UE 1914 connecting via an OTT connection 1916 terminating at the UE 1914 and the host computer 1902. In providing the service to the remote user, the host application 1912 may provide user data which is transmitted using the OTT connection 1916.

The communication system 1900 further includes a base station 1918 provided in a telecommunication system and comprising hardware 1920 enabling it to communicate with the host computer 1902 and with the UE 1914. The hardware 1920 may include a communication interface 1922 for setting up and maintaining a wired or wireless connection with an interface of a different communication device of the communication system 1900, as well as a radio interface 1924 for setting up and maintaining at least a wireless connection 1926 with the UE 1914 located in a coverage area (not shown in FIG. 19) served by the base station 1918. The communication interface 1922 may be configured to facilitate a connection 1928 to the host computer 1902. The connection 1928 may be direct or it may pass through a core network (not shown in FIG. 19) of the telecommunication system and/or through one or more intermediate networks outside the telecommunication system. In the embodiment shown, the hardware 1920 of the base station 1918 further includes processing circuitry 1930, which may comprise one or more programmable processors, ASICs, FPGAS, or combinations of these (not shown) adapted to execute instructions. The base station 1918 further has software 1932 stored internally or accessible via an external connection.

The communication system 1900 further includes the UE 1914 already referred to. The UE's 1914 hardware 1934 may include a radio interface 1936 configured to set up and maintain a wireless connection 1926 with a base station serving a coverage area in which the UE 1914 is currently located. The hardware 1934 of the UE 1914 further includes processing circuitry 1938, which may comprise one or more programmable processors, ASICs, FPGAs, or combinations of these (not shown) adapted to execute instructions. The UE 1914 further comprises software 1940, which is stored in or accessible by the UE 1914 and executable by the processing circuitry 1938. The software 1940 includes a client application 1942. The client application 1942 may be operable to provide a service to a human or non-human user via the UE 1914, with the support of the host computer 1902. In the host computer 1902, the executing host application 1912 may communicate with the executing client application 1942 via the OTT connection 1916 terminating at the UE 1914 and the host computer 1902. In providing the service to the user, the client application 1942 may receive request data from the host application 1912 and provide user data in response to the request data. The OTT connection 1916 may transfer both the request data and the user data. The client application 1942 may interact with the user to generate the user data that it provides.

Figure 19:
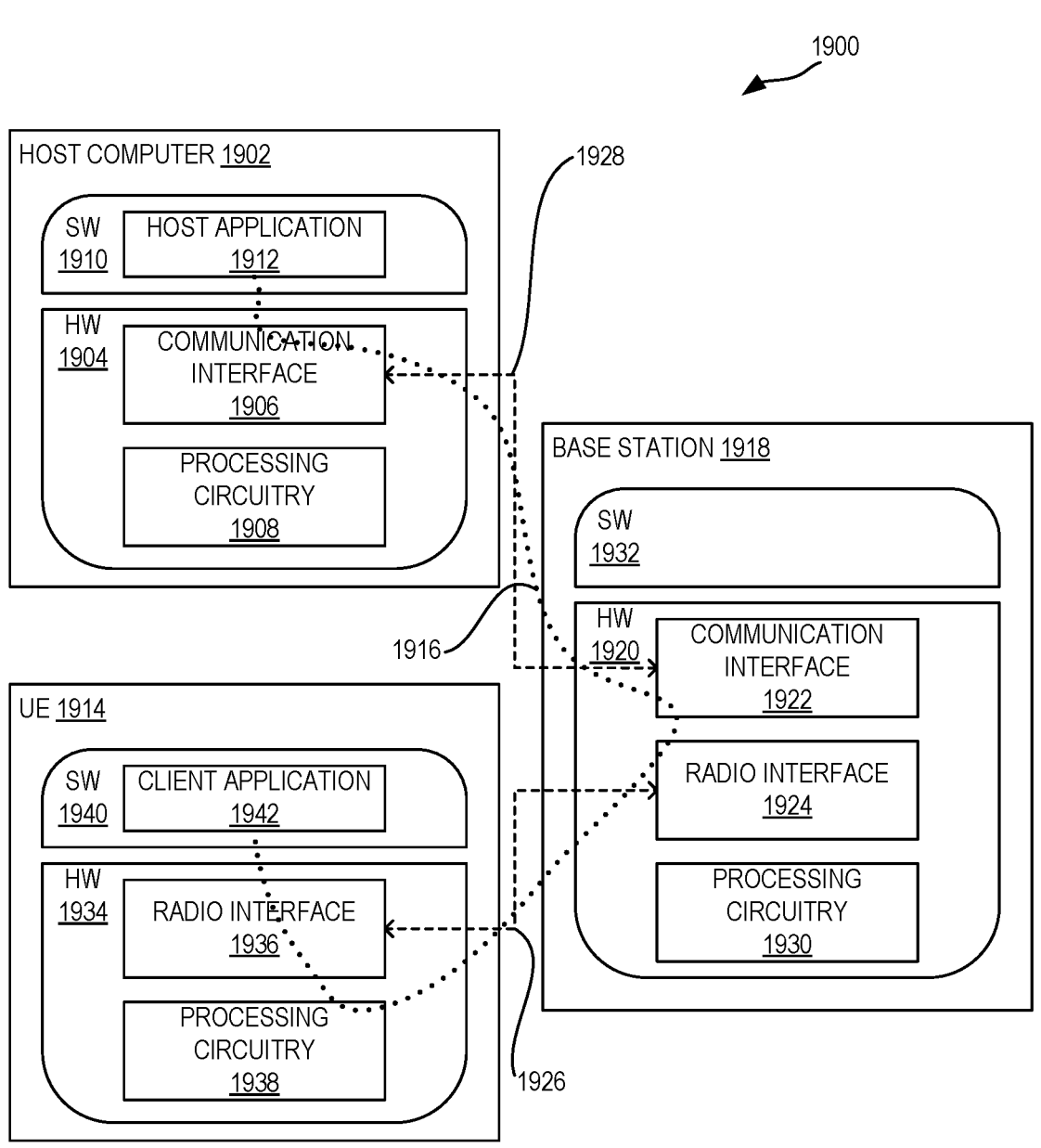
FIG. 19 is a generalized block diagram of a host computer communicating via a base station with a UE over a partially wireless connection in accordance with some embodiments of the present disclosure.

It is noted that the host computer 1902, the base station 1918, and the UE 1914 illustrated in FIG. 19 may be similar or identical to the host computer 1816, one of the base stations 1806A, 1806B, 1806C, and one of the UEs 1812, 1814 of FIG. 18, respectively. This is to say, the inner workings of these entities may be as shown in FIG. 19 and independently, the surrounding network topology may be that of FIG. 18.

In FIG. 19, the OTT connection 1916 has been drawn abstractly to illustrate the communication between the host computer 1902 and the UE 1914 via the base station 1918 without explicit reference to any intermediary devices and the precise routing of messages via these devices. The network infrastructure may determine the routing, which may be configured to hide from the UE 1914 or from the service provider operating the host computer 1902, or both. While the OTT connection 1916 is active, the network infrastructure may further take decisions by which it dynamically changes the routing (e.g., on the basis of load balancing consideration or reconfiguration of the network).

The wireless connection 1926 between the UE 1914 and the base station 1918 is in accordance with the teachings of the embodiments described throughout this disclosure. One or more of the various embodiments improve the performance of OTT services provided to the UE 1914 using the OTT connection 1916, in which the wireless connection 1926 forms the last segment. More precisely, the teachings of these embodiments may improve, e.g., data rate and thereby provide benefits such as, e.g., relaxed restriction on file size.

A measurement procedure may be provided for the purpose of monitoring data rate, latency, and other factors on which the one or more embodiments improve. There may further be an optional network functionality for reconfiguring the OTT connection 1916 between the host computer 1902 and the UE 1914, in response to variations in the measurement results. The measurement procedure and/or the network functionality for reconfiguring the OTT connection 1916 may be implemented in the software 1910 and the hardware 1904 of the host computer 1902 or in the software 1940 and the hardware 1934 of the UE 1914, or both. In some embodiments, sensors (not shown) may be deployed in or in association with communication devices through which the OTT connection 1916 passes; the sensors may participate in the measurement procedure by supplying values of the monitored quantities exemplified above, or supplying values of other physical quantities from which the software 1910, 1940 may compute or estimate the monitored quantities. The reconfiguring of the OTT connection 1916 may include message format, retransmission settings, preferred routing, etc.; the reconfiguring need not affect the base station 1918, and it may be unknown or imperceptible to the base station 1918. Such procedures and functionalities may be known and practiced in the art. In certain embodiments, measurements may involve proprietary UE signaling facilitating the host computer's 1902 measurements of throughput, propagation times, latency, and the like. The measurements may be implemented in that the software 1910 and 1940 causes messages to be transmitted, in particular empty or 'dummy' messages, using the OTT connection 1916 while it monitors propagation times, errors, etc.

Figures 20, 21:
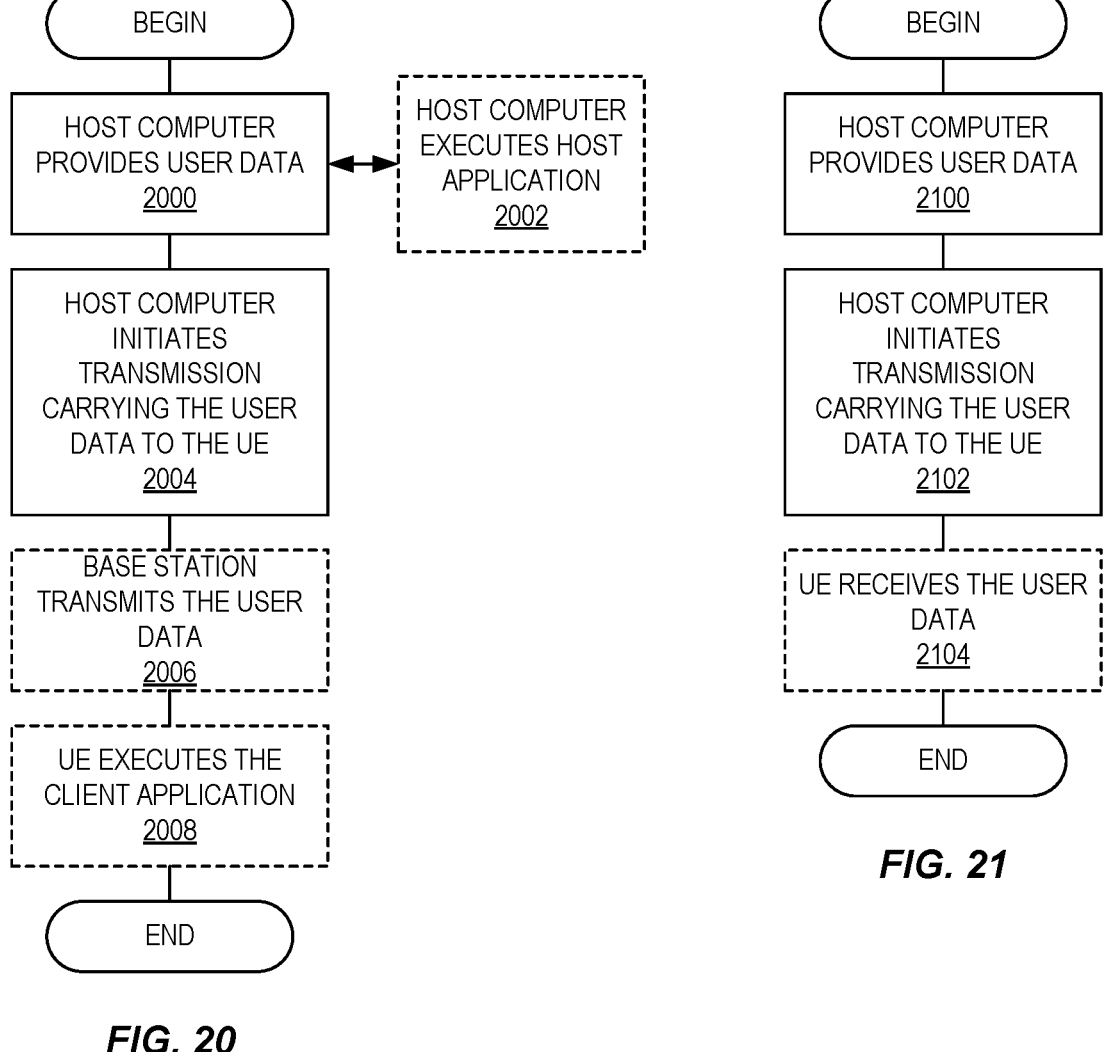
FIG. 20 is a flowchart illustrating a method implemented in a communication system in accordance with one embodiment of the present disclosure.
FIG. 21 is a flowchart illustrating a method implemented in a communication system in accordance with one embodiment of the present disclosure.

FIG. 20 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 20 will be included in this section. In step 2000, the host computer provides user data. In sub-step 2002 (which may be optional) of step 2000, the host computer provides the user data by executing a host application. In step 2004, the host computer initiates a transmission carrying the user data to the UE. In step 2006 (which may be optional), the base station transmits to the UE the user data which was carried in the transmission that the host computer initiated, in accordance with the teachings of the embodiments described throughout this disclosure. In step 2008 (which may also be optional), the UE executes a client application associated with the host application executed by the host computer.

FIG. 21 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 21 will be included in this section. In step 2100 of the method, the host computer provides user data. In an optional sub-step (not shown) the host computer provides the user data by executing a host application. In step 2102, the host computer initiates a transmission carrying the user data to the UE. The transmission may pass via the base station, in accordance with the teachings of the embodiments described throughout this disclosure. In step 2104 (which may be optional), the UE receives the user data carried in the transmission.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Those skilled in the art will recognize improvements and modifications to the embodiments of the present disclosure. All such improvements and modifications are considered within the scope of the concepts disclosed herein.

The invention claimed is:

1. A method of operation of a controller for a Radio Access Network (RAN) node for a cellular communications system, the method comprising:

computing an average total transmit power for transmission for a cell over a control period that comprises a plurality of transmission time intervals (TTIs);

computing an initial physical resource block (PRB) limit for transmission of a physical downlink shared channel for the cell based on a comparison of the average total transmit power and a reference average total transmit power;

determining whether power scaling is to be used;

if power scaling is to be used:

adjusting the initial PRB limit to provide an adjusted PRB limit; and providing the adjusted PRB limit and a power scaling indication to a scheduler associated to the cell; and if power scaling is not to be used:

providing the initial PRB limit and an indication of no power scaling to the scheduler associated to the cell.

2. The method of claim 1, wherein power scaling is to be used if the initial PRB limit is less than or equal to a predefined or preconfigured minimum, non-zero PRB threshold.

3. The method of claim 1, wherein power scaling is to be used if either:

the initial PRB limit is less than or equal to a predefined or preconfigured minimum, non-zero PRB threshold, or the initial PRB limit is greater than the predefined or preconfigured minimum, non-zero PRB threshold but a prior initial PRB limit for a prior control period was less than or equal to the predefined or preconfigured minimum, non-zero PRB threshold and a predefined or preconfigured amount of time has not elapsed between a first time instances associated to the prior control period and a second time instance associated to the control period.

4. The method of claim 1, wherein determining whether power scaling is to be used comprises determining whether the controller is configured in a power scaling state.

5. The method of claim 4, wherein the controller is configured in the power scaling state if the initial PRB limit is less than or equal to a predefined or preconfigured minimum, non-zero PRB threshold.

6. The method of claim 4, wherein the controller is configured in the power scaling state if either:

the initial PRB limit is less than or equal to a predefined or preconfigured minimum, non-zero PRB threshold, or the initial PRB limit is greater than the predefined or preconfigured minimum, non-zero PRB threshold but a prior initial PRB limit for a prior control period was less than or equal to the predefined or preconfigured minimum, non-zero PRB threshold and a predefined or preconfigured amount of time has not elapsed between a first time instance associated to the prior control period and a second time instance associated to the control period.

7. The method of claim 1, wherein adjusting the initial PRB limit to provide the adjusted PRB limit comprises applying a scaling factor to the initial PRB limit, the scaling factor corresponding to a power scaling factor to be applied.

8. The method of claim 7, wherein the power scaling indication indicates the power scaling factor.

9. The method of claim 1, wherein the adjusted PRB limit indicates a number of PRBs that is greater than a number of PRBs indicated by the initial PRB limit.

10. The method of claim 1, wherein the power scaling is power de-boosting such that power spectral density per resource element comprised in the physical downlink shared channel is reduced as compared to when power de-boosting is not used.

11. A method performed by a scheduler for a Radio Access Network (RAN) node for a cellular communications system, the method comprising:

obtaining a recommended physical resource block (PRB) limit for physical downlink shared channel (PDSCH) transmission for an associated cell and a power scaling indication that indicates whether power scaling is needed for PDSCH transmission for the associated cell, the recommended PRB limit and the power scaling indication being for a control period comprising a plurality of transmission time intervals, TTIs;

determining whether the power scaling indication indicates that power scaling is needed;

determining whether the associated cell is cell-edge centric, the associated cell being cell-edge centric if the associated cell predominantly serves cell-edge wireless communication devices; and performing one or more actions based on whether the power scaling indication indicates that power scaling is needed and whether the associated cell is cell-edge centric.

12. The method of claim 11, wherein performing the one or more actions comprises either applying the recommended PRB limit or adjusting the PRB limit based on whether the power scaling indication indicates that power scaling is needed or not needed and whether the associated cell is cell-edge centric or not.

13. The method of claim 11, wherein performing the one or more actions comprises either applying power scaling or not based on whether the power scaling indication indicates that power scaling is needed or not needed and whether the associated cell is cell-edge centric or not.

14. The method of claim 11, wherein:

determining whether the power scaling indication indicates that power scaling is needed comprises determining that the power scaling indication indicates that power scaling is needed;

determining whether the associated cell is cell-edge centric comprises determining that the associated cell is not cell-edge centric; and performing the one or more actions comprises applying the recommended PRB limit and power scaling responsive to determining that the power scaling indication indicates that power scaling is needed and determining that the associated cell is not cell-edge centric.

15. The method of claim 14, wherein performing the one or more actions further comprises adjusting one or more parameters associated to link adaptation in a manner that makes the link adaptation more conservative relative to the link adaptation prior to adjusting the one or more parameters, responsive to applying the power scaling.

16. The method of claim 11, wherein:

determining whether the power scaling indication indicates that power scaling is needed comprises determining that the power scaling indication indicates that power scaling is needed;

determining whether the associated cell is cell-edge centric comprises determining that the associated cell is cell-edge centric; and performing the one or more actions comprises, responsive to determining that the power scaling indication indicates that power scaling is needed and determining that the associated cell is cell-edge centric:

modifying the recommended PRB limit to provide a modified PRB limit;

applying the modified PRB limit; and refraining from applying power scaling.

17. The method of claim 16, wherein modifying the recommended PRB limit comprises modifying the recommended PRB limit such that the recommended PRB limit is reduced in proportion to a scaling factor associated to the power scaling indication in order to provide the modified PRB limit.

18. The method of claim 11, wherein:

determining whether the power scaling indication indicates that power scaling is needed comprises determining that the power scaling indication indicates that power scaling is not needed;

determining whether the associated cell is cell-edge centric comprises determining that the associated cell is not cell-edge centric; and performing the one or more actions comprises, responsive to determining that the power scaling indication indicates that power scaling is not needed and determining that the associated cell is not cell-edge centric:

modifying the recommended PRB limit to provide a modified PRB limit;

applying the modified PRB limit; and applying power scaling.

19. The method of claim 18, wherein modifying the recommended PRB limit comprises applying a scaling factor to the recommended PRB limit that increases the recommended PRB limit in proportion of an applied power scaling factor to provide the modified PRB limit.

20. The method of claim 18, wherein performing the one or more actions further comprises adjusting one or more parameters associated to link adaptation in a manner that makes the link adaptation more conservative relative to the link adaptation prior to adjusting the one or more parameters, responsive to applying the power scaling.

* * * * *